(12) United States Patent
Imamura et al.

(10) Patent No.: US 7,825,957 B2
(45) Date of Patent: Nov. 2, 2010

(54) IMAGE INPUT DEVICE HAVING COLOR TEMPERATURE MEASURING AND CORRECTING CIRCUITS

(75) Inventors: Kunihiro Imamura, Otokuni-gun (JP); Takahiro Iwasawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 1252 days.

(21) Appl. No.: 11/213,990

(22) Filed: Aug. 30, 2005

(65) Prior Publication Data

US 2006/0045512 A1 Mar. 2, 2006

(30) Foreign Application Priority Data

Sep. 1, 2004 (JP) ............... 2004-254301

(51) Int. Cl.
H04N 9/73 (2006.01)
(52) U.S. Cl. .................................. 348/223.1
(58) Field of Classification Search ......... 348/655, 348/223.1
See application file for complete search history.

(56) References Cited

U.S. PATENT DOCUMENTS

| 6,363,220 | B1 * | 3/2002 | Ide | 396/98 |
| 6,917,377 | B2 * | 7/2005 | Aizaki et al. | 348/79 |
| 7,202,895 | B2 * | 4/2007 | Hirai | 348/272 |
| 2004/0095478 | A1 * | 5/2004 | Takano et al. | 348/223.1 |

FOREIGN PATENT DOCUMENTS

| JP | 08-237673 | | 9/1996 |
| JP | 08237673 A | * | 9/1996 |
| JP | 2000-041179 | | 2/2000 |
| JP | 2002-271638 | | 9/2002 |
| JP | 2002271638 A | * | 9/2002 |

OTHER PUBLICATIONS

Chinese Office Action with English translation issued in corresponding Chinese Patent Application No. CN 200510098206.3, issued Jul. 13, 2007.

* cited by examiner

*Primary Examiner*—Jason Chan
*Assistant Examiner*—Gary C Vieaux
(74) *Attorney, Agent, or Firm*—McDermott Will & Emery LLP

(57) ABSTRACT

An image input device according to the present invention comprises an optical lens, an image sensor, a color filter disposed between the optical lens and the image sensor, a memory for temporarily memorizing the imaging signal from the image sensor, a color temperature measuring circuit for measuring a color temperature of the imaging signal read from the image sensor for each of measurement areas into which an entire area of the image sensor is optionally divided, a measurement result storing circuit for temporarily memorizing a result of the color temperature measurement obtained by the color temperature measuring circuit, and a color temperature circuit for inputting the imaging signal from the memory and the color temperature measurement result from the measurement result storing circuit and the color temperature of the imaging signal for each of divided correction areas based on a result of the per-area color temperature measurement.

14 Claims, 31 Drawing Sheets area division for measuring color temperature of illuminating light a1 area division for correcting color temperature of illuminating light a2

F I G. 9
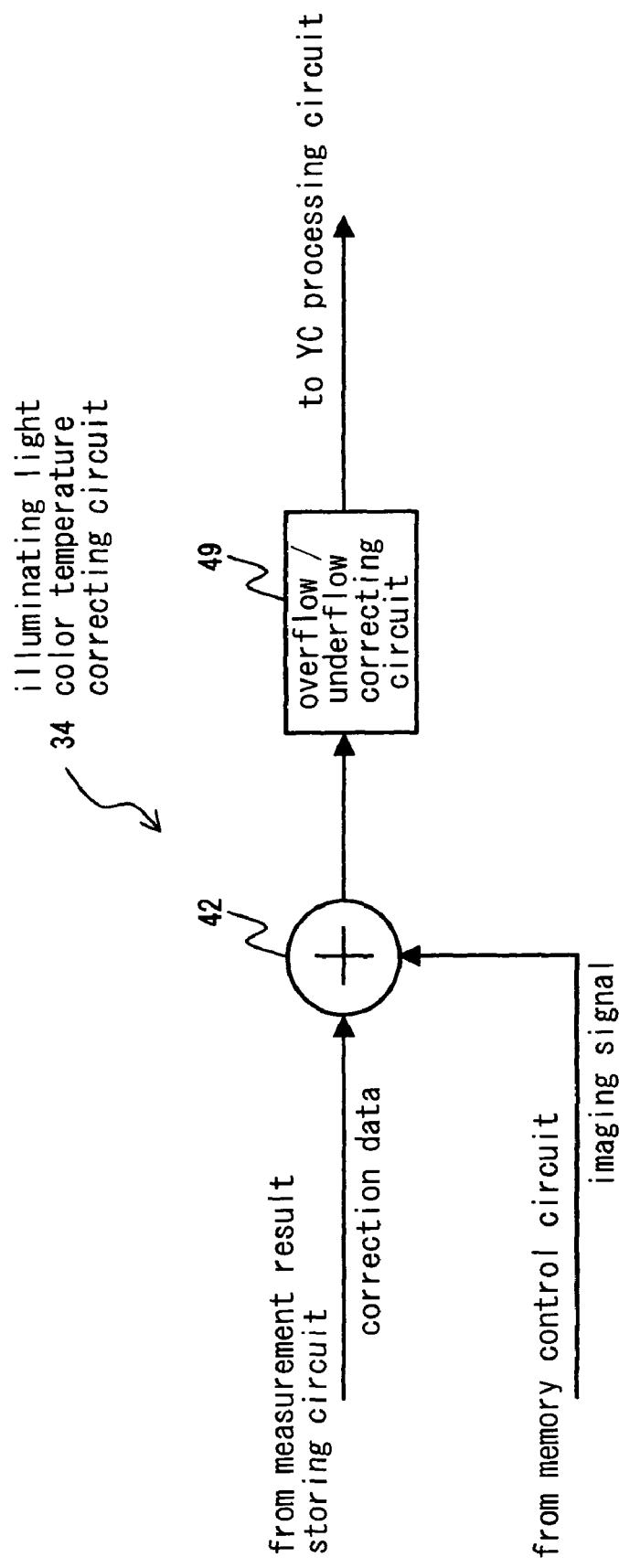

area division for measuring
color temperature of illuminating light area division for correcting
color temperature of illuminating light a3 area division for measuring
color temperature of illuminating light area division for correcting
color temperature of illuminating light a4

F I G. 1 3
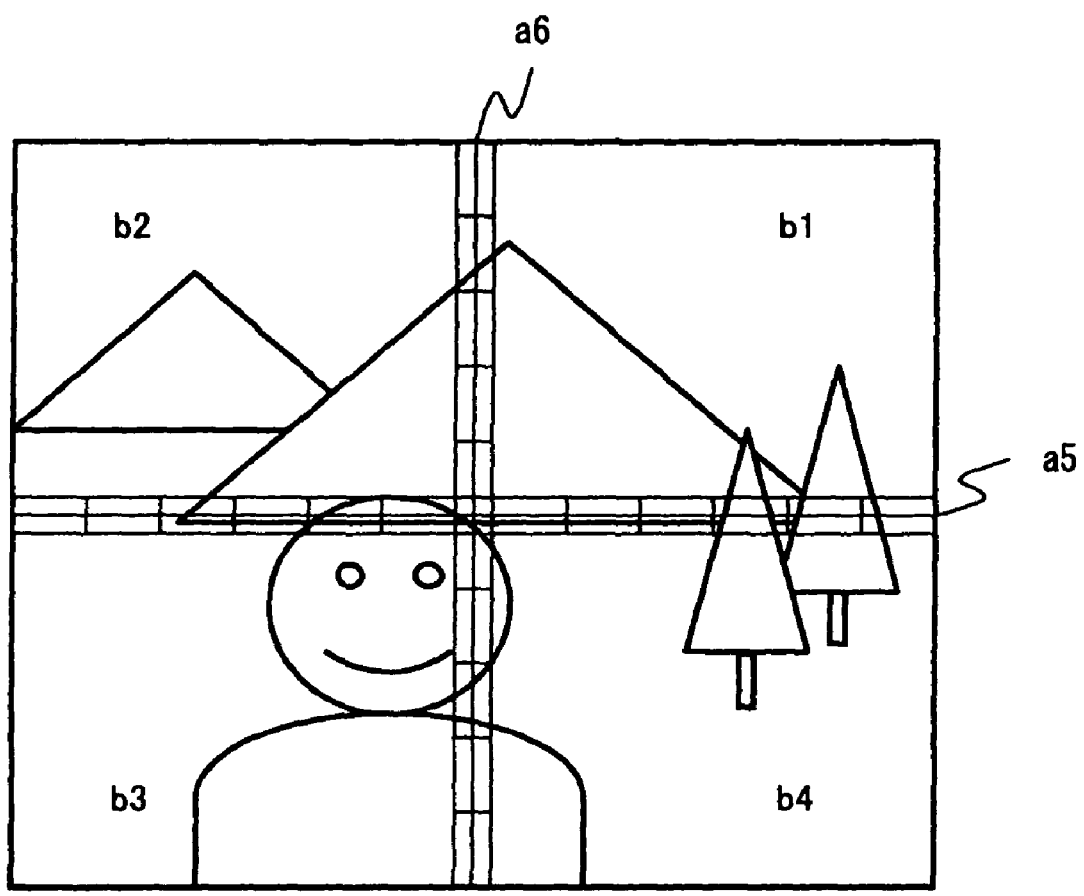
area division for measuring
color temperature of illuminating light F I G. 1 5
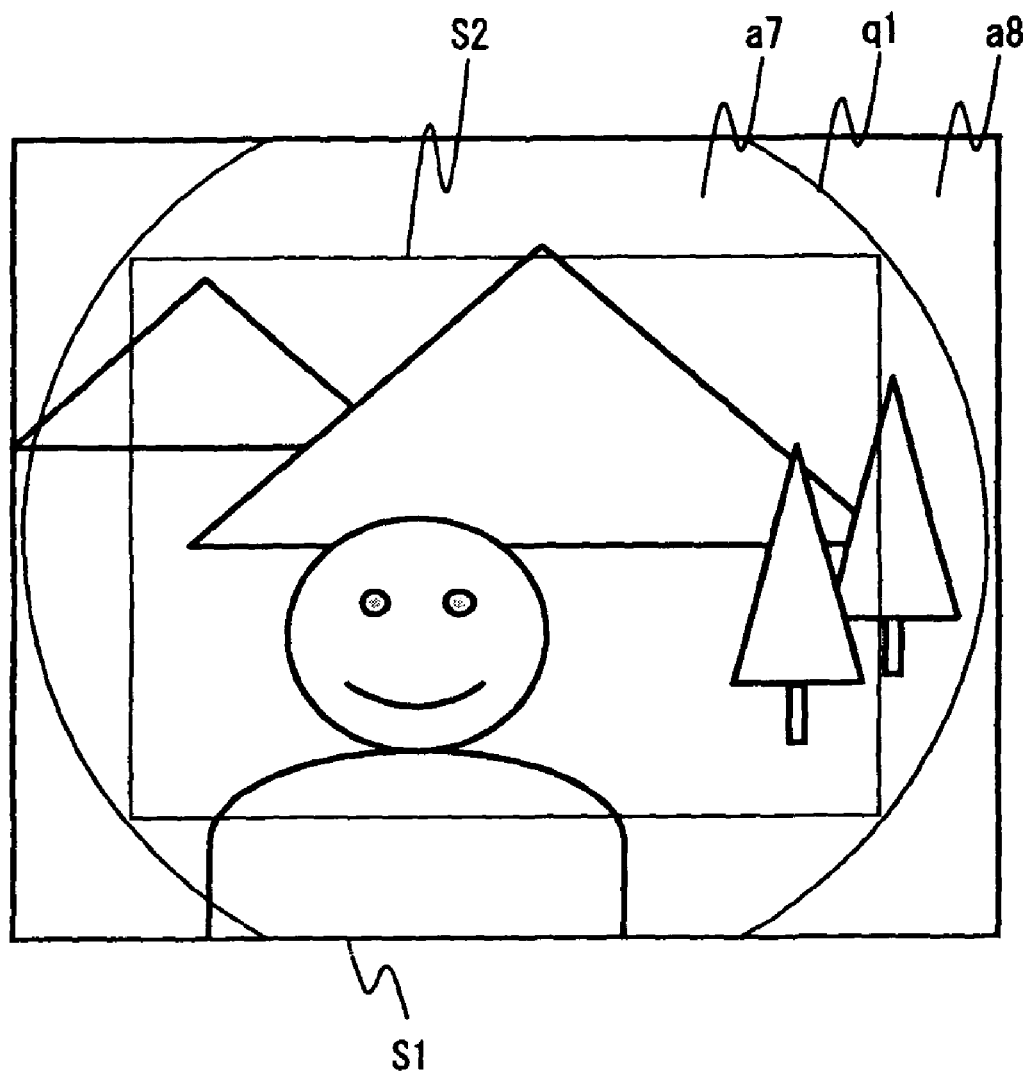

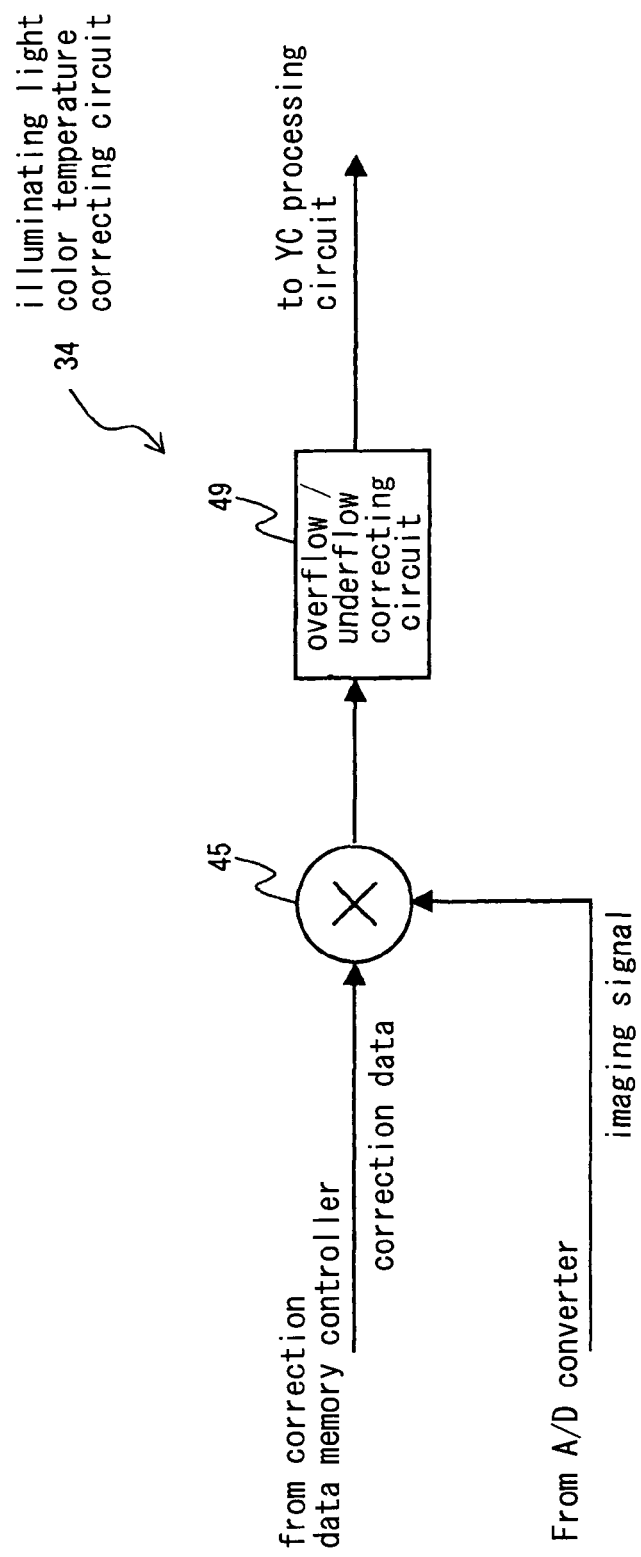

F I G. 1 9
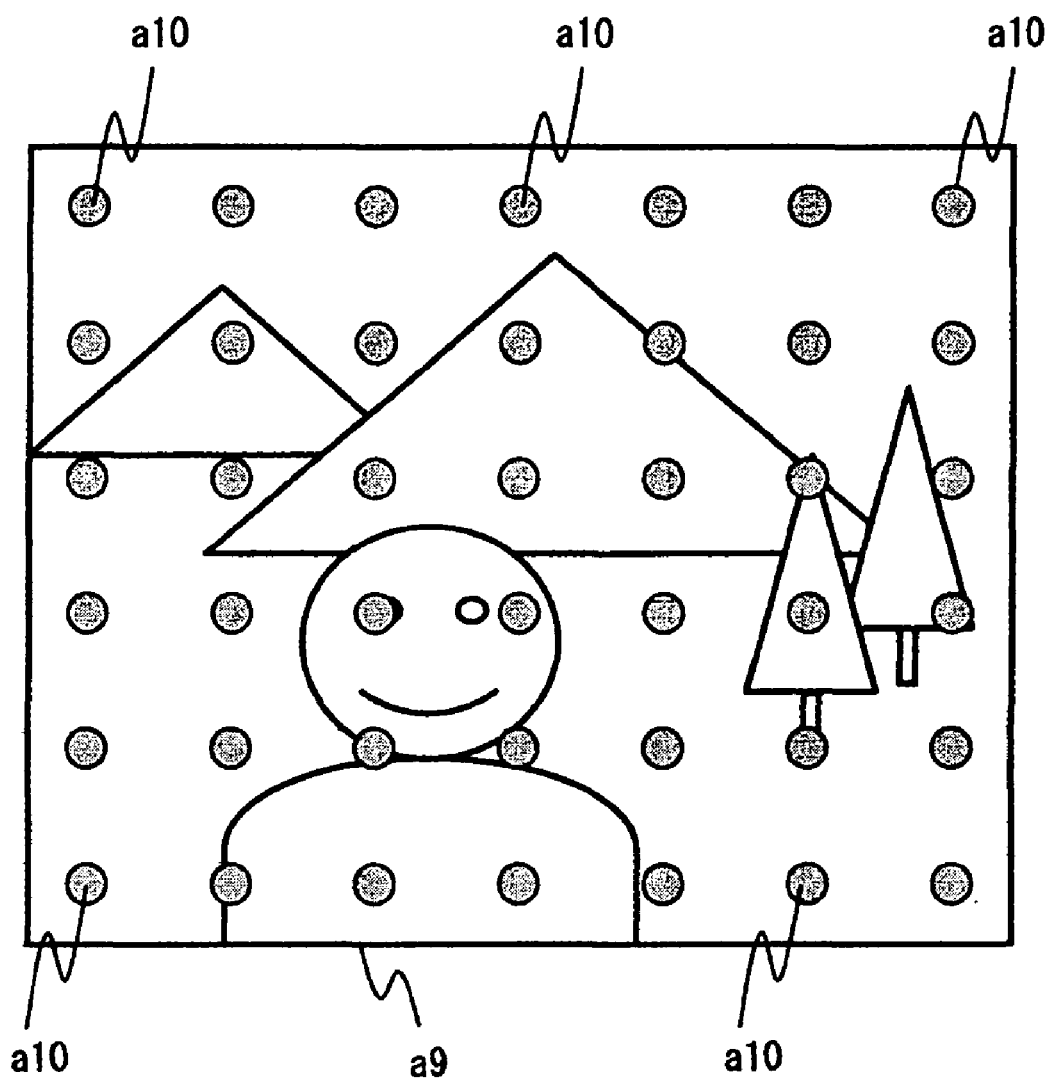

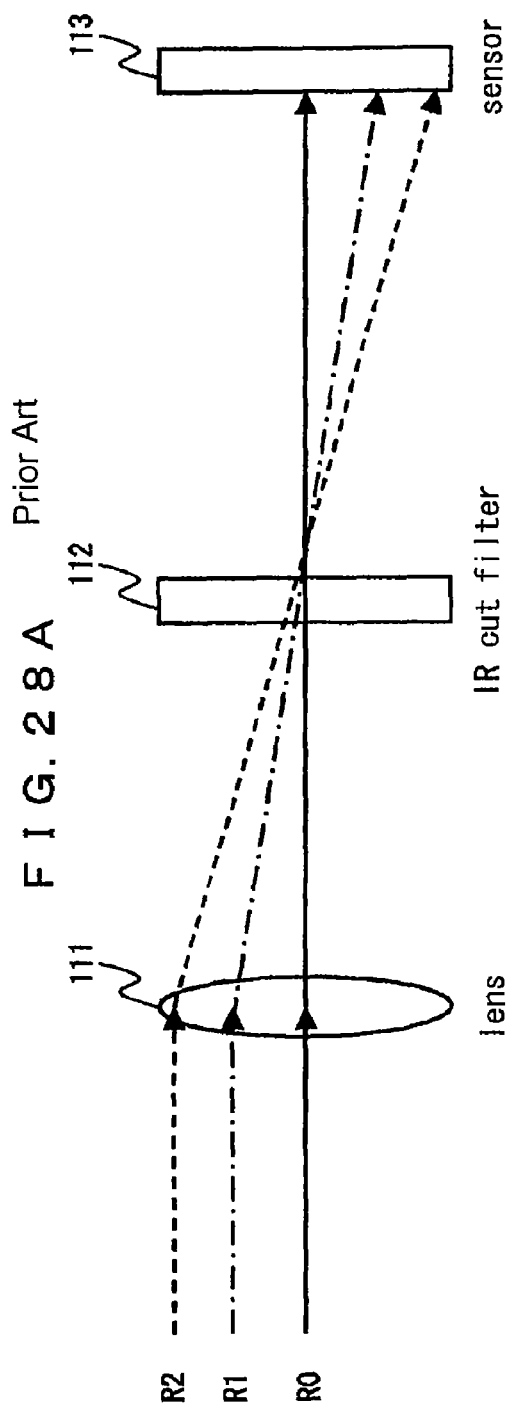
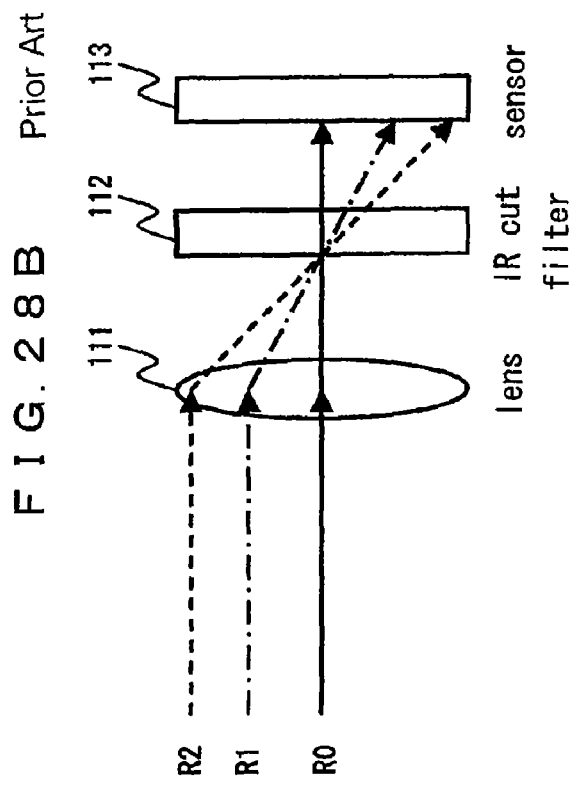
FIG. 28A Prior Art
FIG. 28B Prior Art

IMAGE INPUT DEVICE HAVING COLOR TEMPERATURE MEASURING AND CORRECTING CIRCUITS

FIELD OF THE INVENTION

The present invention relates to an image input device such as an electronic still camera and a video camera, more particularly to a technology for shading correction in relation to a color temperature of an illuminating light.

BACKGROUND OF THE INVENTION

FIG. 27 is a block diagram illustrating a constitution of a conventional electronic still camera.

Referring to reference numerals in the drawing, 111 denotes an optical lens comprising a Rom 111a in which a shading correction coefficient is stored, 112 denotes an IR cut filter for transmitting only a light having a wavelength equal to lower than a near infrared ray, 113 denotes a CCD image sensor as an imaging element for obtaining an imaging signal through a photoelectric conversion, 114 denotes an analog signal processing circuit for executing a correlate double sampling (CDS), a signal amplification and the like, 115 denotes an A/D converter for converting the imaging signal into a digital signal, 116 denotes a digital signal processing circuit for obtaining a video signal by synthesizing (synchronizing) the imaging signal from the image sensor 113 for each of different chrominance signals, 117 denotes a drive circuit for generating a drive pulse of the image sensor 113, 118 denotes a reference voltage operation circuit for converting the shading correction coefficient read from the ROM 111a into a reference voltage of the A/D converter 115, 119 denotes a D/A converter for converting a digital signal outputted from the reference voltage operation circuit 118 into an analog amount and supplying the analog amount to the A/D converter 115 as the reference voltage, and 120 denotes a memory card for storing the video signal obtained in the digital signal processing circuit 116.

The correction coefficient is read from the Rom 111a according to an address supplied from the drive circuit 117, the reference voltage to be supplied to the A/D converter 115 is calculated in the reference voltage operation circuit 118, and the reference voltage is supplied to the A/D converter 115 in the form of the analog amount so as to execute the shading correction (see No. 2000-41179 of the Publication of the Unexamined Japanese Patent Applications/p. 2-3 and FIG. 6).

As shown in FIG. 28A, if there is a sufficient distance between the optical lens 111 and the sensor 113, incident angles of lights R0, R1 and R2 transmitting through the optical lens 111 relative to the IR cut filter 112 are less different to one another. As shown in FIG. 29, a transmission property of the IR cut filter 112 is different depending on the incident angle, however, the difference, which is hardly detectable, is within an allowable range.

However, in recent years, the optical lens 111 and the sensor 113 are arranged to be increasingly closer to each other as shown in FIG. 28B as the downsizing is continuously promoted. Because of the trend, the incident angle of the light relative to the IR cut filter 112 becomes smaller as a distance relative to an optical axis increases. FIG. 30 shows the transmission property of the IR cut filter per wavelength, wherein a band of the transmittable wavelength shifts to a shorter-wavelength side as the distance relative to the optical axis increases. The foregoing phenomenon results in the generation of the imaging signal reddish at a screen center and bluish in a peripheral part of the screen as shown in FIG. 31.

The conventional shading correction is executed based on information such as a position, an aperture, a type and the like of the lens. When the information is fixed to constant values, the shading correction also shows a constant result. However, the foregoing red component is biased depending on the color temperature of the light entering the camera, which is, however, an independent factor apart from the position, aperture, type and the like of the lens. Therefore, the color temperature cannot be appropriately corrected.

In the case of the imaging signal which is not shading-corrected, if the color temperature is corrected based on the imaging signal in the vicinity of the optical axis, a balance is lost in the blue direction in accordance with the increase of the distance relative to the optical axis. On the contrary, the balance is lost in the red direction in the vicinity of the optical axis when the color temperature is corrected based on the imaging signal distant from the optical axis. In either of the foregoing cases, a quality of the imaging signal is deteriorated.

Further, in the case of AF (auto focus) in which a focal point is estimated based on the imaging signal obtained from the image sensor so as to move the lens, when the focal point is estimated based on the imaging signal in which the color temperatures are not corrected, a sampling intensity is biased relative to only the red component, which makes it difficult to estimate a preferable value. As a result, a desired AF operation cannot be realized.

SUMMARY OF THE INVENTION

Therefore, a main object of the present invention is to provide an image input device for accurately correcting a color temperature of an illuminating light.

An image input device according to the present invention comprises:

an optical lens;

an image sensor for converting an image of a photographic subject obtained from the optical lens into an imaging signal;

a color filter disposed on the image sensor;

a color temperature measuring circuit for measuring a color temperature of the imaging signal read from the image sensor for each of measurement areas into which an entire area of the image sensor is optionally divided; and a color temperature correcting circuit for correcting the color temperature of the imaging signal for each of correction areas divided in a state same as or different to the division of the measurement areas based on a result of the per-area color temperature measurement obtained by the color temperature measuring circuit.

More specifically, the image input further comprises:

a memory for temporarily memorizing the imaging signal from the image sensor; and a measurement result storing circuit for temporarily memorizing the color temperature measurement result obtained by the color temperature measuring circuit, wherein the color temperature correcting circuit inputs the imaging signal from the memory and the color temperature measurement result from the measurement result storing circuit and corrects the color temperature of the imaging signal for each of the correction areas divided in the state same as or different to the division of the measurement areas based on the per-area color temperature measurement result.

According to the foregoing constitution, the color temperature is measured for each of the measurement areas and the color temperature is corrected for each of the correction areas in the imaging signal read from the image sensor. Therefore, the color temperature can be appropriately corrected (shading correction) in each of the correction areas.

In the image input device according to the foregoing constitution, the measurement areas in the color temperature measuring circuit and the correction areas in the color temperature correcting circuit may coincide with or different to each other.

In the imaging input device according to the foregoing constitution, the measurement areas and the correction areas may respectively have concentric non-circular shapes similar to a shape of an aperture of the optical lens provided in a previous stage of the image sensor. A combination pattern of the concentric aperture-opening shapes having different sizes corresponds to a transmission property of the color separating filter showing symmetric patterns in both horizontal and vertical directions from a screen center toward a periphery of the screen. Accordingly, the number of the required areas can be reduced in comparison to an area dividing method in which an entire area of the image sensor is divided into the horizontal and vertical directions in such a simpler manner that the individual areas have no particular relationship therebetween. As a result, the number of correction data, the number of correcting operations and the like can be reduced, which can downsize the circuits.

As a preferable example of the shape similar to the shape of the aperture can be mentioned a pattern of concentric tilted squares.

In the image input device according to the foregoing constitution, the respective shapes of the measurement areas and the correction areas may have concentric circular shapes. In this constitution, the number of the required areas can be reduced in comparison to the area dividing method in which the entire area is divided into the horizontal and vertical directions in such a simpler manner that the individual areas have no particular relationship therebetween. As a result, the number of correction data, the number of correcting operations and the like can be reduced, which can downsize the circuits.

In the image input device according to the foregoing constitution, the measurement areas may have linear states elongated in the vertical and horizontal directions passing through a center of the entire area of the image sensor, and the correction areas may have concentric circular shapes centered at the center of the entire area. In this case, the color temperature measuring circuit is adapted to interpolate the color temperature measurement result obtained in the linear-state measurement areas in estimate information corresponding to the concentric circular divided areas.

In the foregoing constitution, the color temperature measurement is carried out, not in the entire area of the image sensor, but in a part of the entire area, which corresponds to the linear-state areas in the horizontal and vertical directions. The correction data in the non-measurement area is interpolated based on the color temperatures obtained in the linear-state areas in the horizontal and vertical directions or correction data based on the color temperatures. Accordingly, the circuits can be further downsized because the correction data in the non-measurement area is interpolated.

In the foregoing constitution, the color temperature correcting circuit may be adapted to correct the color temperature by adding the correction data corresponding to the imaging signal from the image sensor to the imaging signal. Accordingly, in the case in which a property of the color-temperature shading represents a DC (direct current) component (in the case in which the color-temperature shading is generated in such manner as an offset variation of a level different at each address of the imaging signal), the color temperature can be accurately corrected.

The color temperature correcting circuit may be alternatively adapted to correct the color temperature by multiplying the imaging signal from the image sensor by the correction data corresponding the imaging signal. Accordingly, in the case in which the property of the color-temperature shading represents an AC (alternate current) component (in the case in which the color-temperature shading is generated in such manner as a gain variation of a level different at each address of the imaging signal), the color temperature can be accurately corrected.

The color temperature correcting circuit may be alternatively adapted to correct the color temperature by adding the correction data corresponding to the imaging signal from the image sensor to the imaging signal and multiplying the imaging signal by the correction data. Accordingly, in the case in which the property of the color-temperature shading represents a state in which the AC component and the DC component are present in a mixed manner (in the case in which the color-temperature shading is generated in such manner as the offset variation and gain variation of the levels different at each address of the imaging signal), the color temperature can be accurately corrected.

In the image input device according to the foregoing constitution, the color temperature measuring circuit may be alternatively adapted to correct the color temperature of the imaging signal using, of the imaging signals read by the image sensor, only the imaging signal in the area not affected by lens shading by the optical lens provided in the previous stage of the image sensor.

According to the foregoing constitution, the area of the imaging signal serving as a basis of the correction data is free of any influence from the lens shading, and the area of the imaging signal whose color temperature is to be corrected is also free of any influence from the lens shading. Therefore, the influence from the lens shading can be avoided in and beyond an initial stage, and the color-temperature shading correction, which is largely affected by such conditions as the color temperature and a positional relationship between the lens and the image sensor, can be accurately executed. The described effect can also be applied to an image input device not adapted to correct the shading resulting from the optical lens.

Further, an image input device according to the present invention comprises:

an optical lens;

an image sensor for converting an image of a photographic subject obtained from the optical lens into an imaging signal;

a color filter disposed on the image sensor;

a color temperature measuring portion for measuring a color temperature;

a correction data memory for storing correction data of the color temperature in association with an address and the color temperature of the imaging signal in the image sensor;

a correction data memory control circuit for searching the correction data in the correction data memory using the address and the color temperature as parameters;

a microprocessor for inputting the imaging signal from the image sensor, the address of the imaging signal and the measured color temperature from the color temperature measuring circuit and controlling the correction data memory control circuit using the address and the measured color temperature of the imaging signal as parameters; and a color temperature correcting circuit for correcting the color temperature of the imaging signal from the image sensor using the correction data read from the correction data memory via the correction data memory control circuit under the control of the microprocessor.

The color temperature measuring circuit may be a color temperature measuring sensor for measuring the color temperatures of the photographic subject and a periphery thereof without using the imaging signal from the image sensor.

The correction data memory may be adapted to store the correction data by means of a look-up table format, and the color temperature correcting circuit may be adapted to replace the imaging signal with the correction data read from the correction data memory by means of the look-up table format.

According to the foregoing constitution, the correction data memory is provided so as to store the correction data of the color temperature beforehand therein in comparison to the aforementioned image input device, in which the correction data is generated when required based on the color temperature measured by the color temperature measuring circuit.

According to the foregoing constitution, the microprocessor searches the correction data memory via the correction data memory control circuit using the address of the imaging signal read from the image sensor in the image sensor and the measured color temperature from the color temperature measuring sensor as the parameters to thereby read the correction data of the color temperature corresponding to the address and the measured color temperature and transmit the read correction data to the color temperature correcting circuit. The color temperature correcting circuit corrects the color temperature of the imaging signal read from the image sensor using the received correction data. The correction data used in the color temperature correction relates not only to the measured color temperature but also to the address of the imaging signal. To be brief, the correction data is comparable to the aforementioned area division. Because the color temperature of the imaging signal is corrected based on the correction data of the color temperature including the address information, the color temperature can be appropriately corrected (shading correction) in compliance with the address of the imaging signal. Further, the correction data is simply read from the correction data memory by means of the table format, which makes it unnecessary to generate the correction data whenever necessary based on the measured color temperature. As a result, a processing speed can be improved.

Further, the provision of the correction data memory facilitates the renewal of the correction data.

In the foregoing constitution, the microprocessor is preferably provided with a feature of calculating new correction data based on the imaging signal and the measured color temperature and writing the calculated new correction data in the correction data memory in accordance with the address of the corresponding imaging signal so as to renew the data therein when a correction data renewal command is inputted thereto.

The microprocessor may be provided with a feature of reading the correction data from the correction data memory, revising the correction data based on the imaging signal and the measured color temperature and writing the revised new correction data in the correction data memory in accordance with the address of the corresponding imaging signal so as to renew the data therein when the correction data renewal command is inputted.

In some cases, the color temperature may not be accurately corrected due to environmental changes and disturbances. When that happens, the renewal of the correction data is instructed so that the correction data is renewed by the microprocessor. The microprocessor calculates the new correction data suitable for the current conditions based on a signal value of the imaging signal and the measured color temperature and writes the new correction data in the correction data memory in accordance with the address of the corresponding imaging signal so as to renew the data therein. Alternatively, the correction data may be read from the correction data memory and revised. Thus, flexible responses in order to deal with any influence from the environmental changes and disturbances can be realized when the correction data is revised whenever necessary.

In the foregoing constitution, the correction data memory may be adapted to store the correction data using a property of the optical lens as a parameter in addition to the address and the color temperature. The color temperature correction can be even more flexibly handled by combining information such as a type, a focal point and the like of the optical lens.

In the foregoing constitution, a data interpolation method can be adopted. More specifically, assuming that the correction data memory stores the correction data in a discrete manner in relation to the addresses of the imaging signal from the image sensor, the color temperature correcting circuit is adapted to calculate the correction data with respect to the imaging signal through the interpolation using the correction data at an address adjacent to the address of the imaging signal in the correction data memory and correct the color temperature using the calculated correction data in the interpolation when the address of the imaging signal does not correspond to the address of the correction data in the correction data memory.

According to the foregoing constitution, the color temperature correcting circuit has the interpolating feature, and the correction data memory need not contain the correction data corresponding to all of the addresses of the imaging signal but only stores the correction data therein in the discrete manner. As a result, a required capacitance can be reduced, and the circuit size can thereby be controlled.

The interpolation described above includes an approximation using a direct function, an approximation using a quadric function and approximations using other functions.

The image input device may be effectively constituted as follows in order to avoid the influence from the lens shading.

More specifically, an image input device according to the present invention comprises:

an optical lens;

an image sensor for converting an image of a photographic subject obtained from the optical lens into an imaging signal;

a color filter disposed on the image sensor;

a zoom magnification adjusting lens disposed in a previous stage of the optical lens;

a memory for temporarily memorizing the imaging signal from the image sensor;

a color temperature measuring circuit for measuring a color temperature of the imaging signal read from the image sensor for each of measurement areas into which an entire area of the image sensor is divided;

a measurement result storing circuit for temporarily storing a result of the color temperature measurement by the color temperature measuring circuit;

a color temperature correcting circuit for inputting the imaging signal from the memory and the color temperature measurement result from the measurement result storing circuit and correcting the color temperature of the imaging signal for each of correction areas divided in a state same as or different to the division of the measurement areas based on a result of the per-area color temperature measurement by the color temperature measuring circuit; and a microprocessor for controlling the zoom magnification adjusting lens in an initial stage of a photographing operation to have a zoom magnification different to a zoom magnification desired in the photographing operation and validating the color temperature measuring circuit and the measurement result storing circuit with respect to the imaging signal currently obtained, the microprocessor further controlling the zoom magnification adjusting lens to have the zoom magnification desired in the photographing operation, validating the memory with respect to the imaging signal currently obtained and validating the color temperature correcting circuit.

The foregoing constitution is characterized in the features of the zoom magnification adjusting lens and the microprocessor. The microprocessor controls the zoom magnification adjusting lens in the initial stage of the photographing operation so as to have the zoom magnification different to the zoom magnification desired in the photographing operation as a result of pressing down a release or the like. Then, the microprocessor validates the color temperature measuring circuit and the measurement result storing circuit, measures the color temperature of the imaging signal from the image sensor for each of the measurement areas, and temporarily memorizes the color temperature measurement result in the measurement result storing circuit. As a result, the color temperature measured from the imaging signal free of the influence from the lens shading and equivalent to a general angle of view is obtained. Next, the microprocessor controls the zoom magnification adjusting lens to have the zoom magnification desired in the photographing operation, validates the memory, and temporarily memorizes the imaging signal from the image sensor. Next, the microprocessor validates the color temperature correcting circuit and inputs the imaging signal from the memory and the color temperature measurement result from the measurement result storing circuit, and then, corrects the color temperature of the imaging signal for each area based on the color temperature measurement result. Accordingly, the color temperature is measured from the imaging signal free of the influence from the lens shading and equivalent to the general angle of view, and then, the measured color temperature is corrected. As a result, the color-temperature shading can be highly accurately corrected without any influence from the lens shading.

Further, an image input device according to the present invention comprises:

an optical lens;

an image sensor for converting an image of a photographic subject obtained from the optical lens into an imaging signal;

a color filter disposed on the image sensor;

a color temperature measuring sensor for measuring color temperatures of the photographic subject and a periphery thereof;

a correction data memory for storing correction data of the color temperature in association with an address and the color temperature of the imaging signal in the image sensor;

a correction data memory control circuit for searching the correction data in the correction data memory using the address and the color temperature as parameters;

a microprocessor for inputting the imaging signal from the image sensor, the address of the imaging signal and the measured color temperature from the color temperature measuring sensor and controlling the correction data memory control circuit using the address and the measured color temperature of the imaging signal as parameters;

a color temperature correcting circuit for correcting the color temperature of the imaging signal from the image sensor using the correction data read from the correction data memory via the correction data memory control circuit under the control of the microprocessor; and a zoom processing circuit for cutting out data within a predetermined coordinate distance from a coordinate center on data corresponding to a center of an entire area of the image sensor in the color-temperature-corrected imaging signal from the color temperature correcting circuit and zooming the cut-out data.

The foregoing constitution is characterized in that the zoom processing circuit is provided. In contrast to that the zoom magnification adjusting lens is provided at a foremost end of an information communication path, the zoom processing circuit is provided at a rearmost end thereof. The zoom processing circuit cuts out the data within the predetermined coordinate distance from the coordinate center on the data in the color-temperature-corrected imaging signal from the color temperature correcting circuit. Thereby, the color-temperature shading can be corrected in the state in which the influence from the lens shading is avoided. The foregoing effect applies to the image input device not provided with the feature of correcting the shading due to the optical lens.

The image input device may be developed as follows in order to attain auto focus avoiding the influence from the color-temperature shading.

The imaging input device further comprises, in the foregoing constitution:

a focal distance adjusting lens disposed in the previous stage of the optical lens; and an AF processing circuit for extracting a particular frequency component from the color-temperature-corrected imaging signal of the color temperature correcting circuit and judging a focusing degree of the imaging signal, wherein the focal distance adjusting lens is controlled based on a result of the judgment of the focusing degree from the AF processing circuit.

The foregoing constitution is characterized in that the color temperature of the imaging signal is corrected beforehand in the case of judging the focusing degree of the imaging signal so that the focusing degree is judged in the color-temperature-corrected imaging signal. Because the focusing degree is judged in the color-temperature-corrected imaging signal, the auto focus can be realized with a high precision in the state in which the influence from the color temperature shading is avoided.

The features of the color temperature correction in order to deal with the color temperature and the shading correction in order to deal with the optical lens may be preferably combined. As a result of combining the features, the constitution can be rationalized in terms of the circuits, wherein the circuits and the power consumption can be curtailed.

As thus far described, according to the present invention, the color-temperature shading generated in the imaging signal due to the color temperature of the illuminating light can be appropriately corrected, wherein the flexible responses dealing with the various applications, such as the circuit size, correction accuracy, intended use and the like, can be adequately realized. Further, the possible failure of attaining the focal point due to a false signal brought by the color-temperature shading can be avoided.

BRIEF DESCRIPTION OF THE DRAWINGS

The present invention is illustrated be way of example and not limitation in the figures of the accompanying drawings, in which like references indicate similar elements and in which:

FIG. 9 is a block diagram illustrating a constitution of a color temperature correcting circuit according to the second preferred embodiment;

FIG. 13 shows an area-dividing pattern in measuring and correcting the color temperature according to a fourth preferred embodiment of the present invention;

FIG. 15 shows an area-dividing pattern in measuring and correcting the color temperature according to the fifth preferred embodiment;

FIG. 18 is a block diagram illustrating a constitution of a color temperature correcting circuit according to the sixth preferred embodiment;

FIG. 19 is an illustration of discreteness of correction data according to a seventh preferred embodiment of the present invention;

FIGS. 28A and 28B are illustrations of a variation generated in a distance between an optical lens and an image sensor.

DETAILED DESCRIPTION OF THE INVENTION

Figure 1:
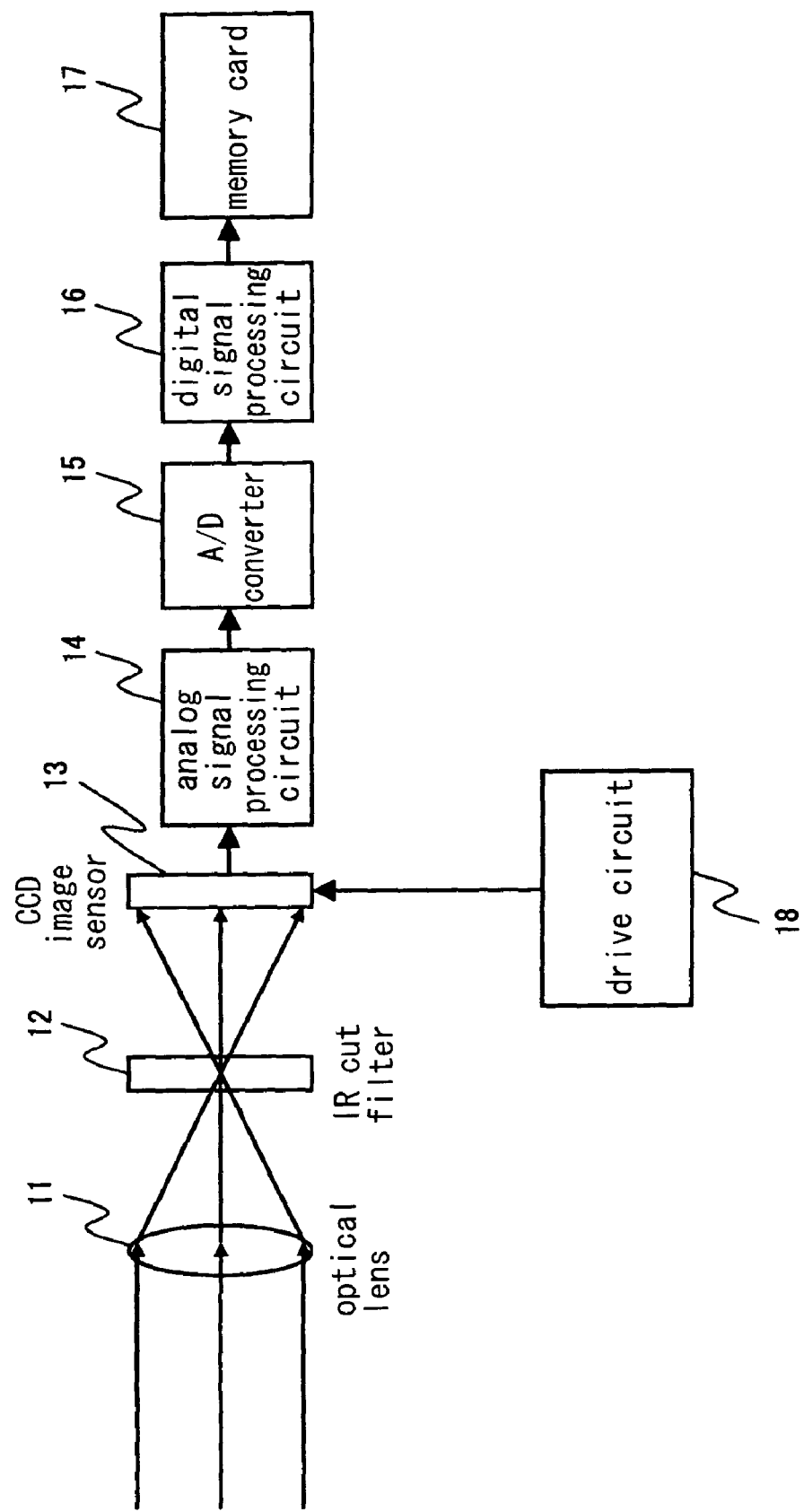
FIG. 1 is a block diagram illustrating a constitution of an image input device according to a first preferred embodiment of the present invention.

Hereinafter, preferred embodiments of the present invention are described referring to the drawings.

First Preferred Embodiment

FIG. 1 is a block diagram illustrating a constitution of an image input device according to a first preferred embodiment of the present invention. In the image input device, an IR (infrared ray) cut filter 12 is disposed between an optical lens 11 and a CCD image sensor 13 so that a component on a long-wavelength side of an incident light via the IR cut filter 12 is removed when a photographic subject is image-formed on the image sensor 13 by the optical lens 11. The image sensor 13 is an imaging element of a single-plate type in which photoelectric conversion elements for executing photoelectric conversion are two-dimensionally disposed and color filters of different colors are disposed on the photoelectric conversion elements. An imaging signal of the image sensor 13 is read by means of a drive signal generated in a drive circuit 18. The read imaging signal is subjected to a correlate double sampling and a signal amplification in an analog signal processing circuit 14, and then, the resulting imaging signal from the analog signal processing circuit 14 is converted into a digital signal in an A/D converter 15 as a signal converter. A digital signal processing circuit 16 executes a color-temperature shading correcting process in order to deal with a color temperature of an illuminating light (hereinafter, briefly referred to as color temperature) to the imaging signal and synthesizes (synchronizes) the imaging signal, to which the color-temperature shading correction is already done, based on different chrominance signals, and then, executes a processing for obtaining a video signal. As a result, the video signal is obtained. Here the video signal is defined as the signal used for both of a still image and a video image. The obtained video signal is converted into compression format (for example JPEG, or MPEG) and recorded on a recording medium such as a memory card 17.

Figure 2:
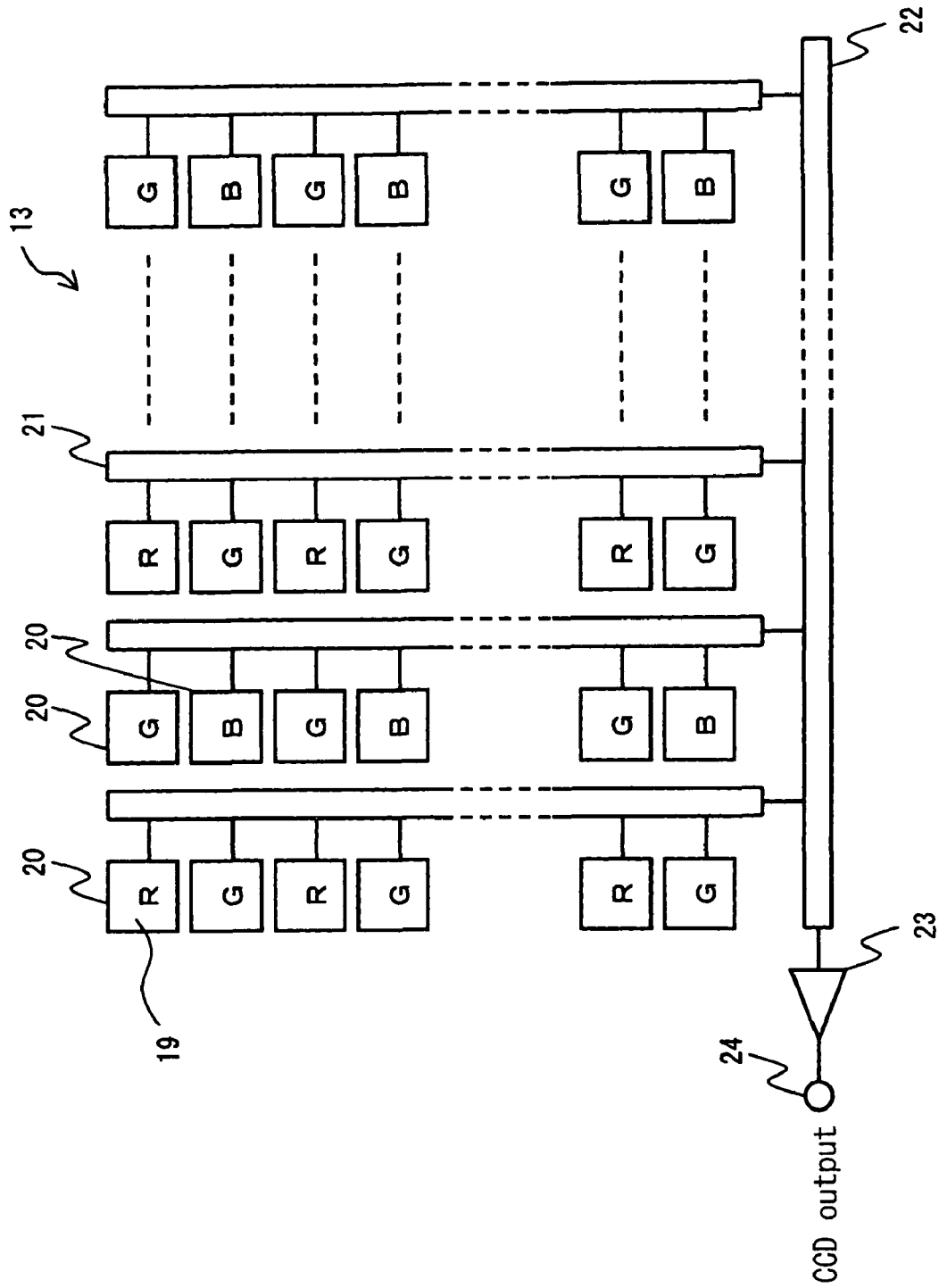
FIG. 2 is an illustration of a CCD image sensor.

In the CCD image sensor 13, photoelectric conversion elements 19 are two-dimensionally disposed as shown in FIG. 2, and RGB color filters 20 for separating a R component, a G component or a B component are Bayer-arrayed on the photoelectric conversion elements. The light irradiated on the photoelectric conversion elements 19 has its specific chrominance component removed therefrom in the color filters 20 and reaches the photoelectric conversion elements 19 to be thereby converted into a charge signal. The charge signal is transferred from the photoelectric conversion element 19 to vertical transfer CCDs 21 disposed adjacent to the photoelectric conversion elements 19 by a pulse supplied from an external drive circuit, and further, transferred to a horizontal transfer CCD 22 by the pulse supplied from the drive circuit. The charge signal transferred to the horizontal transfer CCD 22 is further transferred to an amplifier 23 by the pulse supplied from the drive circuit and converted into a voltage signal in the amplifier 23. The voltage signal is outputted from an output terminal 24.

Figure 3:
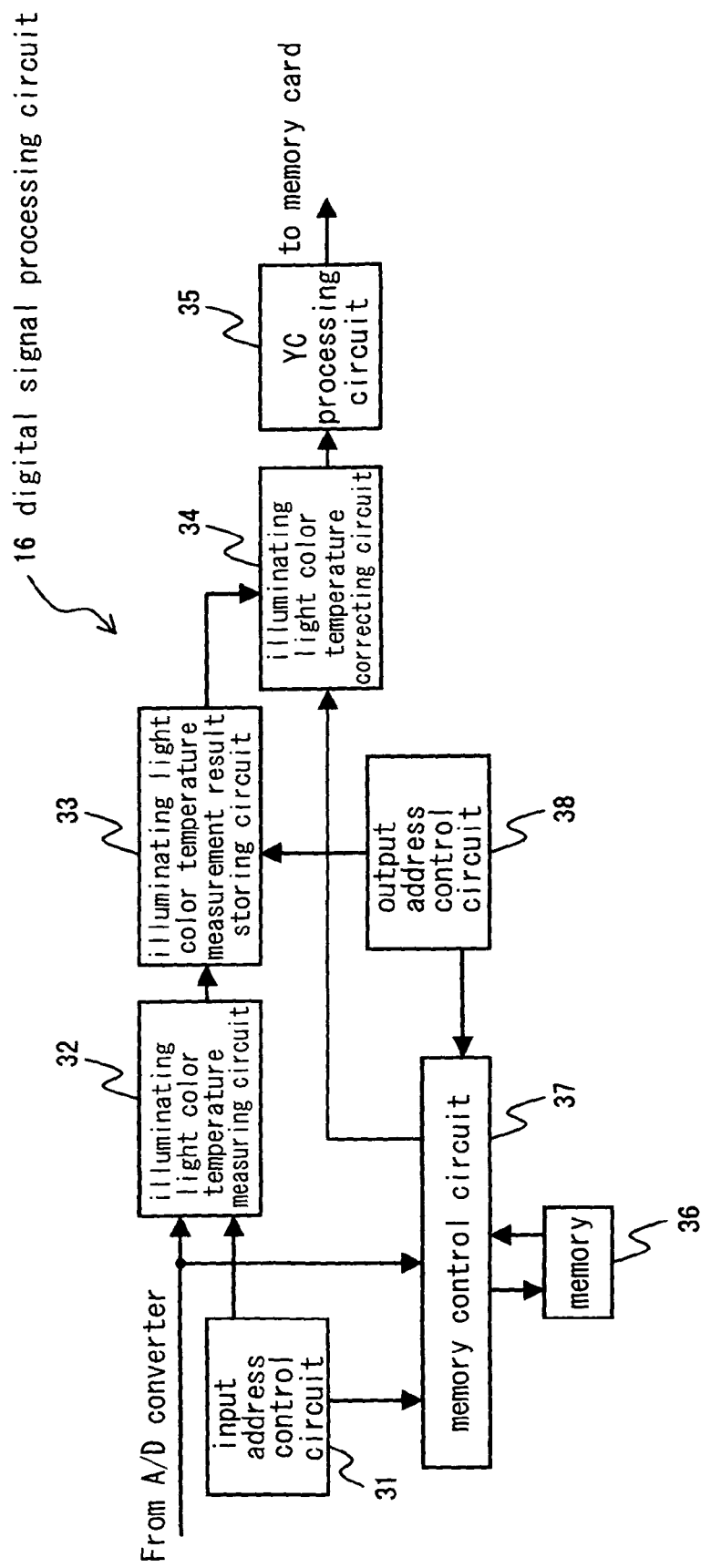
FIG. 3 is a block diagram illustrating a constitution of a digital signal processing circuit according to the first preferred embodiment.

FIG. 3 is a block diagram illustrating a constitution of the digital signal processing circuit 16. The digital signal processing circuit 16 comprises an input address control circuit 31 for controlling an address of the imaging signal converted into the digital signal in the A/D converter 15 and inputted thereto, a illuminating light color temperature measuring circuit 32 for dividing the imaging signal into predetermined areas in accordance with the address of the imaging signal generated in the input address control circuit 31 and measuring the color temperature of the imaging signal per area, the illuminating light color temperature measuring circuit 32 further outputting necessary color temperature correction data in accordance with the measured color temperature, a illuminating light color temperature measurement result storing circuit 33 for storing a result of the measurement by the color temperature measuring circuit 32, a memory 36 in which the imaging signal is recorded, an output address control circuit 38 for controlling the address of the imaging signal at which the imaging signal recorded in the memory 36 is read in accordance with the address of the imaging signal, a memory control circuit 37 for generating a signal for controlling the write and read of the data with respect to the memory 36 in accordance with control signals of the input address control circuit 31 and the output address control circuit 38, an illuminating light color temperature correcting circuit 34 for correcting the color temperature of the imaging signal read from the memory 36 based on the color temperature measurement result outputted from the measurement result storing circuit 33, and a YC processing circuit 35 for synthesizing the color-temperature-corrected imaging signal from the color temperature correcting circuit 34 for each of the chrominance signals and obtaining the video signal.

Figure 4:
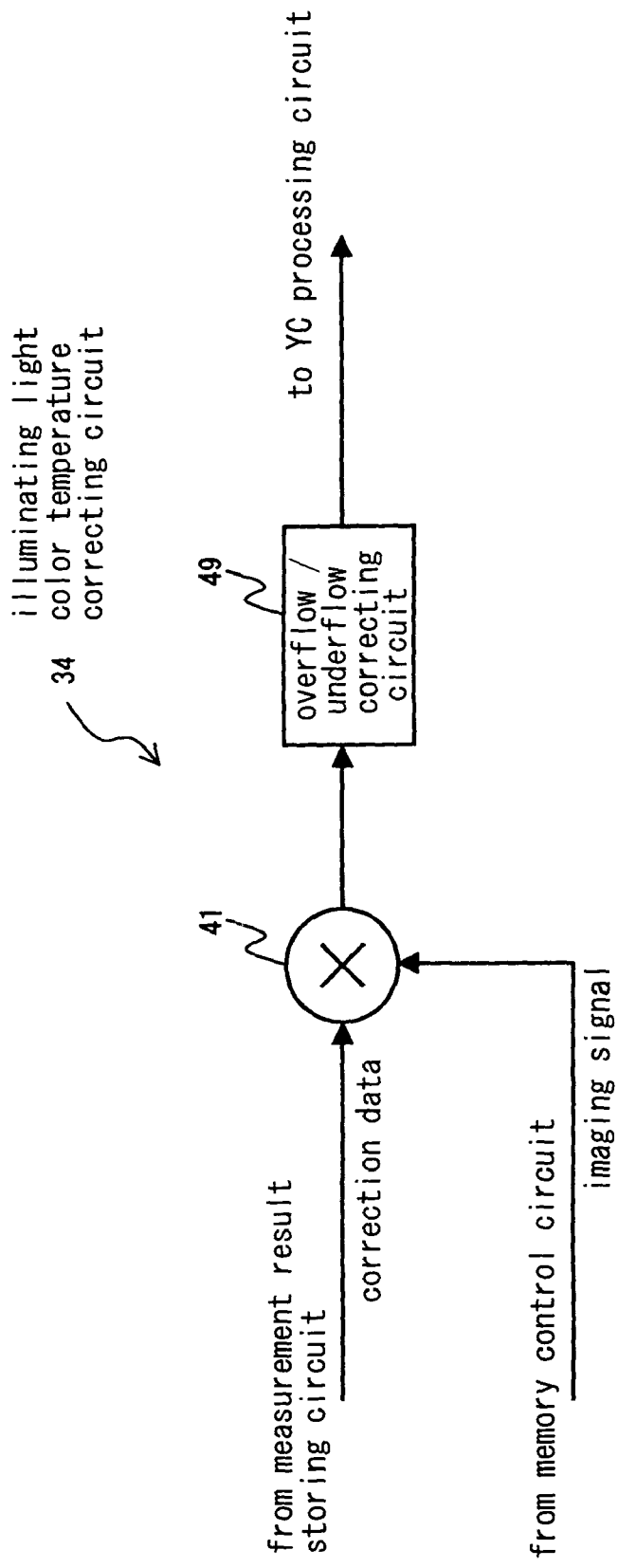
FIG. 4 is a block diagram illustrating a constitution of a color temperature correcting circuit according to the first preferred embodiment.

The color temperature correcting circuit 34 comprises, as shown in FIG. 4, a multiplier 41 for multiplying the imaging signal read from the memory 36 by the correction data from the measurement result storing circuit 33 and a overflow/underflow correcting circuit 49 for clipping underflow and overflow values in a result of the operation by the multiplier 41 and controlling the operation result to stay within a predetermined bit range.

Figure 5:
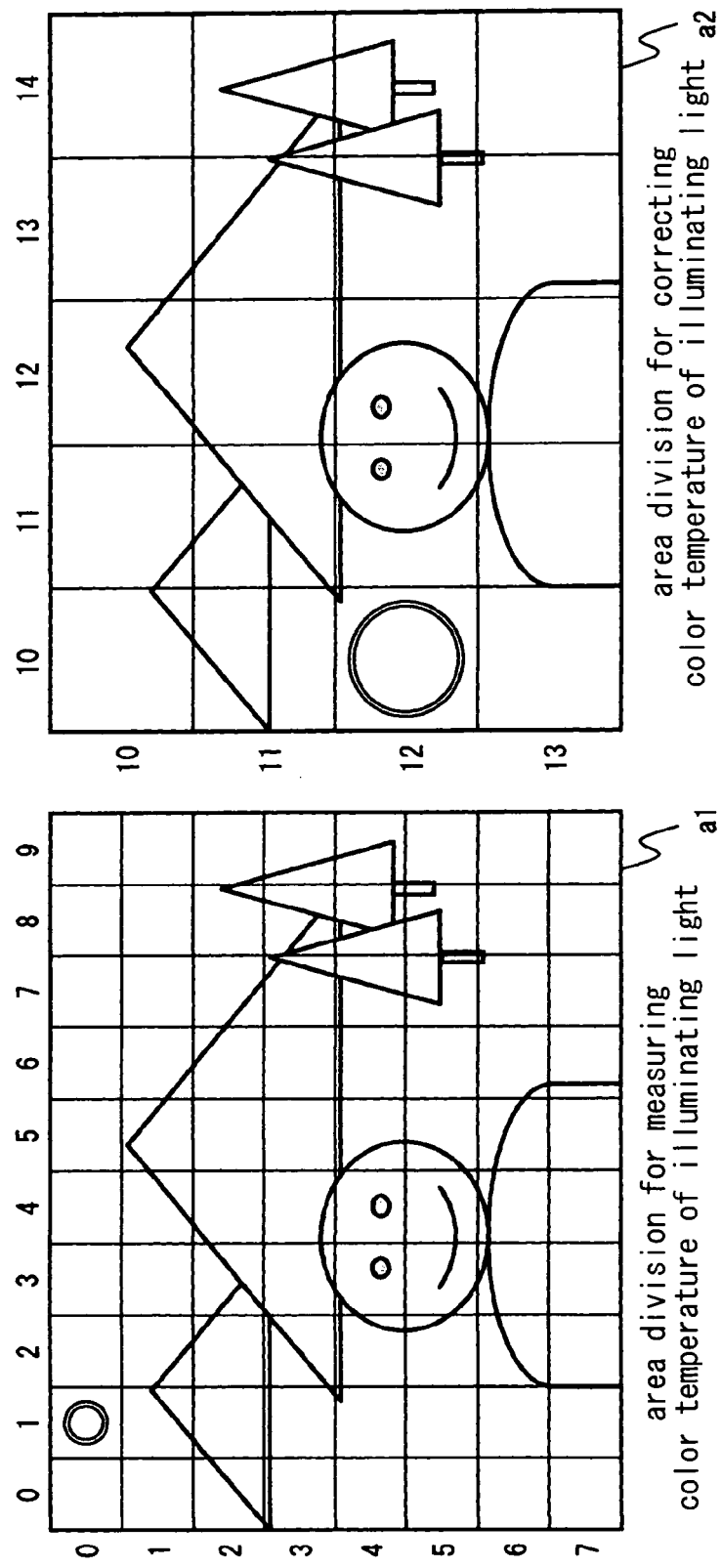
FIG. 5 shows area-dividing patterns in measuring and correcting a color temperature according to the first preferred embodiment.

As shown in FIG. 5, the color temperature measuring circuit 32 measures the color temperature of the imaging signal obtained from the image sensor 13 per area in accordance with the address from the input address control circuit 31 through the area division as shown in a pattern a1, and outputs a coefficient for correcting the color temperature with respect to the area-divided data of the imaging signal based on a result of the measurement as shown in a pattern a2.

Values shown in the upper and left sides of the patterns a1 and a2 are used as coordinates of the divided areas. For example, an area indicated by a double circle in the pattern a1 is represented by (1,0), and an area indicated by a double circle in the pattern a2 is represented by (10,12). For example, the correction of the color temperature at coordinates (11,11) is executed based on the color temperature measurement results of coordinates (2,2), (3,2) (2,3) and (3,3).

The image of the photographic subject transmits through the IR cut filter 12 via the optical lens 11 and image-formed on the image sensor 13. The imaging signal photo-electrically converted by the image sensor 13 is subjected the signal processings such as the correlate double sampling and signal amplification in the analog signal processing circuit 14. Then, the output of the analog signal processing circuit 14 is converted from an analog signal into the digital signal in the A/D converter 15. The digital signal from the A/D converter 15 is subjected to the color temperature measurement by the color temperature measuring circuit 32 through the area division as shown in the pattern a1 based on the address from the from the input address control circuit 31, and the color temperature correction data obtained based on the measurement result is stored in the measurement result storing circuit 33. Meanwhile, the digital signal from the A/D converter 15 is stored in the memory 36 via the memory control circuit 37 based on the control signal from the input address control circuit 31.

After the correction data of the patterns a1 and a2 are stored in the measurement result storing circuit 33, the memory control circuit 37 reads the imaging signal stored in the memory 36 in accordance with the output address control circuit 38. The data used for the color temperature correction with respect to the area of the imaging signal read via the memory control circuit 37 is read from the measurement result storing circuit 33, and the imaging signal and the correction data are both outputted to the color temperature correcting circuit 34.

The color temperature correcting circuit 34 multiplies the imaging signal read from the memory 36 by the correction data from the measurement result storing circuit 33 in the multiplier 41, and then, clips the data beyond the bit range in the overflow/underflow correcting circuit 49 and outputs the resulting data. The output signal color-temperature-corrected in the color temperature correcting circuit 34 is synthesized for each of the different chrominance signals in the YC processing circuit 35 and subjected to the processing for obtaining the video signal. Then, the resulting video signal is outputted to the memory card 17 to be recorded therein.

As described, according to the present embodiment, the image of the photographic subject is inputted from the optical lens 11, and the color temperature in any optional area of the imaging signal obtained from the photographic subject can be corrected. As a result, the color-temperature shading, whose state differs depending on the conditions of the color temperature and the positional relationship between the optical lens 11 and the image sensor 13, can be corrected.

In the case of using the multiplier when the color temperature is corrected in the color temperature correcting circuit 34, the color-temperature shading in an AC state, that is the color temperature shading generated in such manner as a gain variation of a level different at each address of the imaging signal, can be appropriately corrected.

Figure 6:
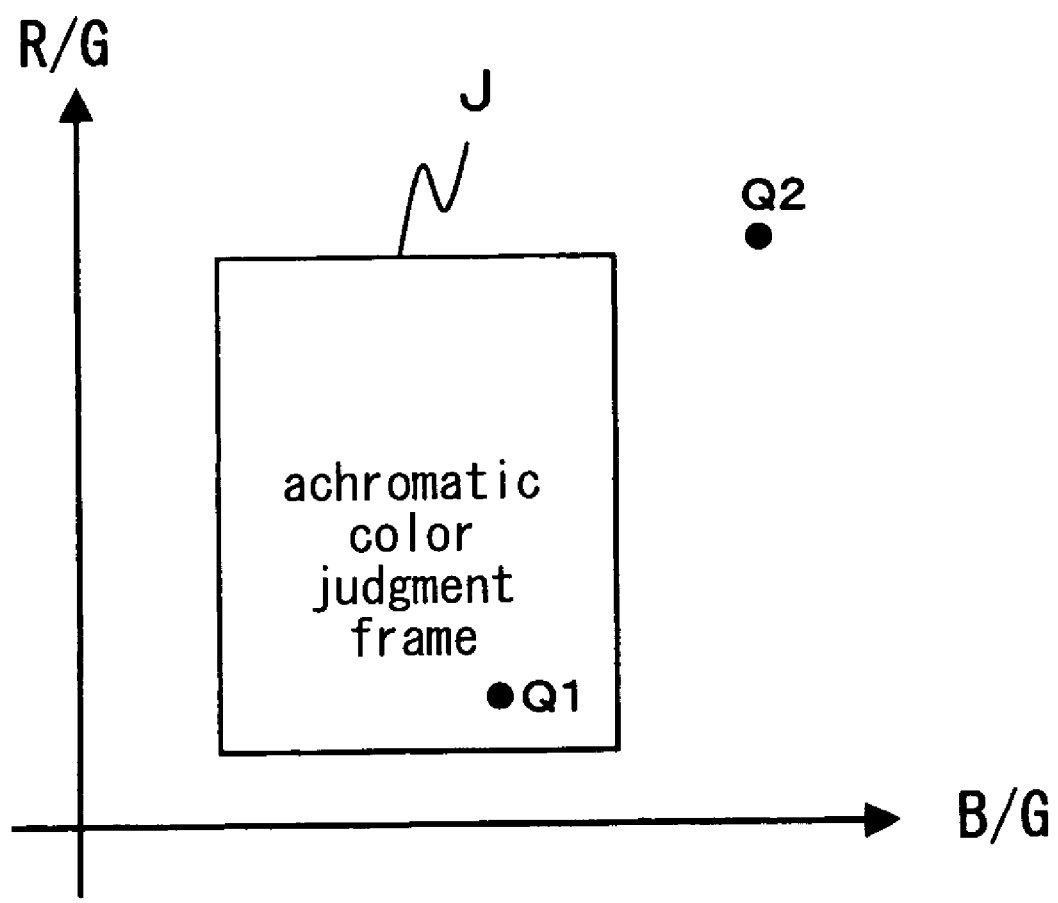
FIG. 6 is an illustration of the color temperature measurement.

Next, the color temperature measurement is described in detail. A horizontal axis in FIG. 6 represents a ratio of a B component relative to a G component, while a vertical axis represents a ratio of an R component relative to the G component. A reference symbol J denotes an achromatic color judgment frame. In each of the divided areas in the image sensor 13, a value of the R component, a value of the G component and a value of the B component are accumulated and assigned to FIG. 6. The accumulated value of the R component in a certain area is referred to as R(1), the accumulated value of the G component is referred to as G(1), and the accumulated value of the B component is referred to as B(1), and a relevant property point Q1 is plotted. The property point Q1 is inside the achromatic color judgment frame J, and therefore, is subjected to the color temperature measurement. The color temperature of the relevant divided area is calculated from ratios of the R component, G component and B component in an achromatic part of the photographic subject, which are γR, γG and γB. The accumulated value of the R component in a different area is referred to as R(2), the accumulated value of the G component is referred to as G(2) and the accumulated value of the B component is referred to as B(2), and a relevant property point Q2 is plotted. The property point Q2 is outside the achromatic color judgment frame J, and therefore, is not adopted. In such a case, an approximate calculation is executed based on the color temperature measurement result in an adjacent area.

The measured color temperature is corrected as follows. A gain correction of ($\gamma$G/$\gamma$R) is executed to the R-component signal in the imaging signal in an area. A gain correction of ($\gamma$G/$\gamma$B) is executed to the B-component signal. Thereby, the ratio of the R component, G component and B component in the imaging signal in the achromatic part of the photographic subject can be corrected to be 1:1:1. More specifically, the achromatic color can be outputted to the video signal as the achromatic color even in the case of outputting the achromatic imaging signal as the chromatic imaging signal due to the color temperature.

Second Preferred Embodiment

In a second preferred embodiment of the present invention, the measurement area and the correction area have a shape similar to the shape of the aperture of the optical lens.

Figure 7:
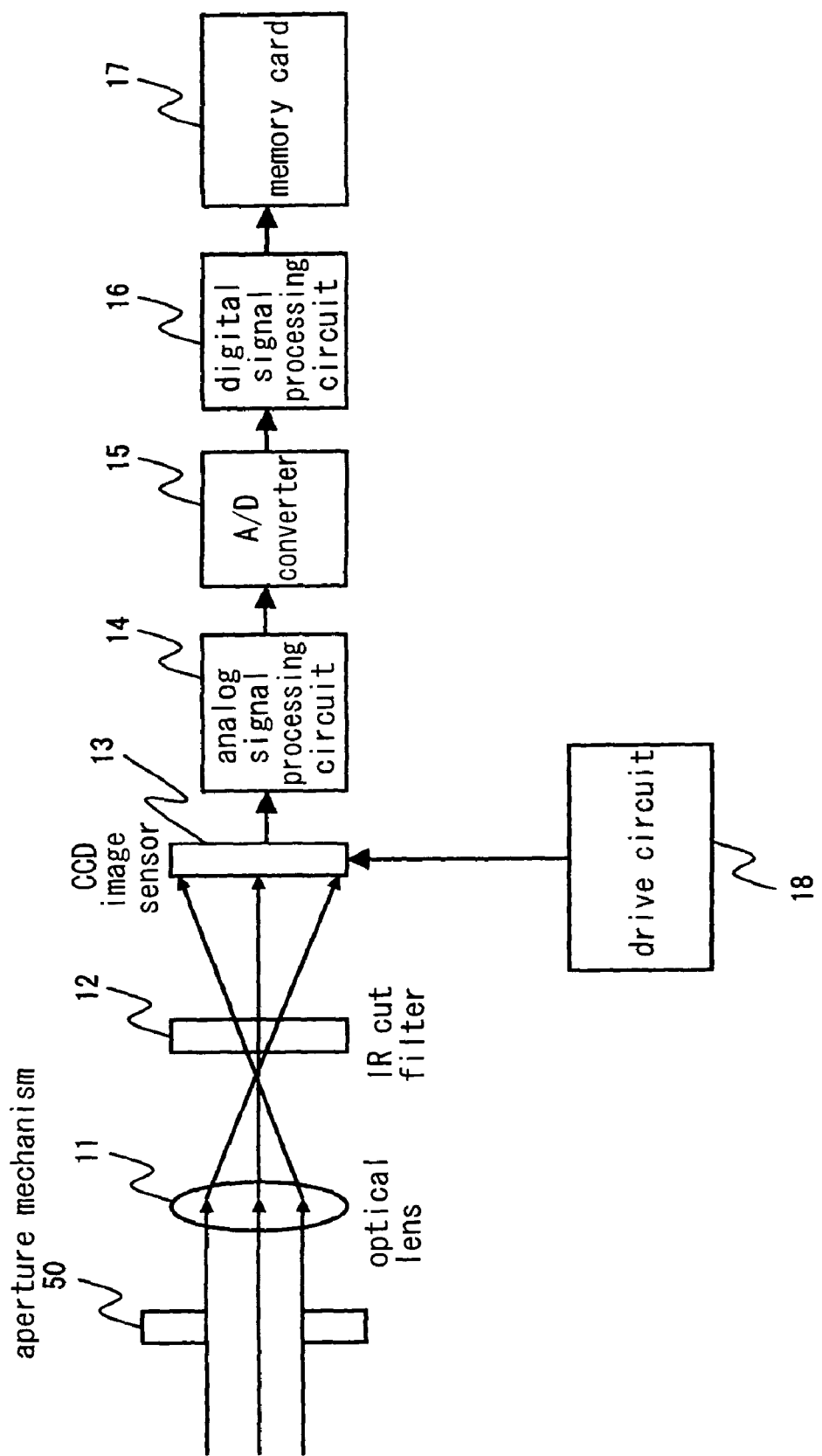
FIG. 7 is a block diagram illustrating a constitution of an image input device according to a second preferred embodiment of the present invention.

FIG. 7 is a block diagram illustrating a constitution of an image input device according to the second preferred embodiment, wherein an aperture mechanism 50 for adjusting an amount of the incident light with respect to an optical lens 11 is further provided in the constitution of FIG. 1. A digital signal processing circuit 16 according to the present embodiment is constituted in the same manner as in FIG. 3.

Figure 8A:
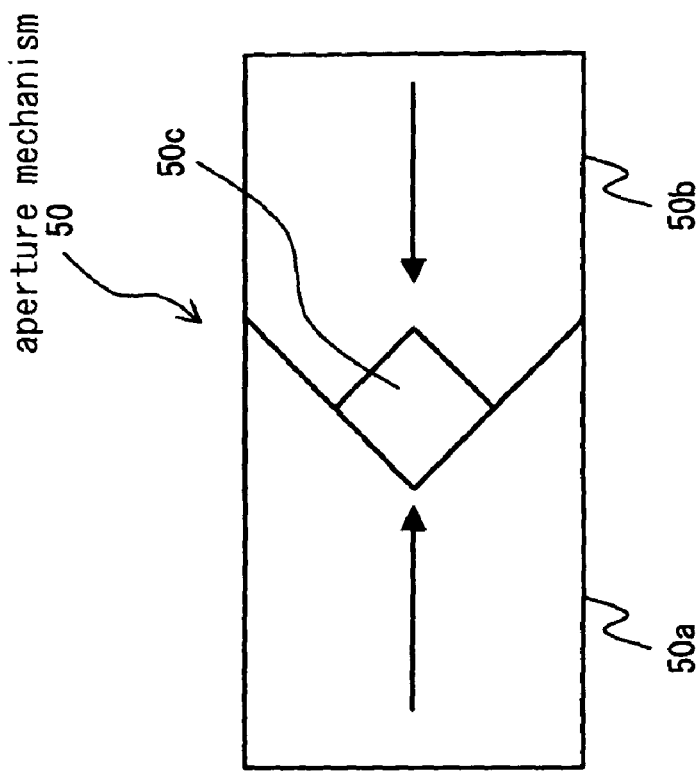
FIGS. 8A and 8B are illustrations of an aperture mechanism according to the second preferred embodiment.
Figure 8B:
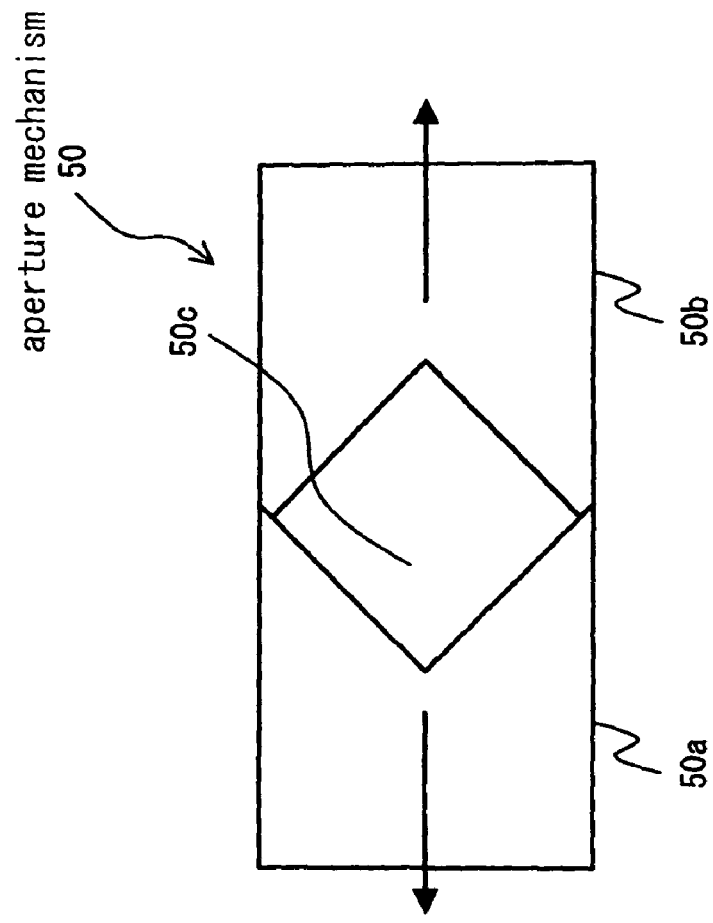

FIG. 8 are illustrations of the aperture mechanism 50. The aperture mechanism 50 comprises aperture blades 50a and 50b on right and left sides viewed from a direction of an optical axis. When it is desirable to increase the amount of the incident light with respect to an image sensor 13, the right and left aperture blades 50a and 50b are moved away from each other as shown in FIG. 8A. This operation enlarges an opening 50c for deciding the amount of the incident light with respect to the optical lens 11, which serves to increase the amount of the incident light with respect to the image sensor 13. On the other hand, when it is desirable to decrease the amount of the incident light with respect to the image sensor 13, the right and left aperture blades 50a and 50b are moved to be closer to each other as shown in FIG. 8B. The amount of the incident light with respect to the image sensor 13 can be adjusted by combining the foregoing operations.

FIG. 9 is a block diagram illustrating a constitution of a color temperature correcting circuit 34 according to the second preferred embodiment. The color temperature correcting circuit 34 comprises an adder 42 for adding an input from a measurement result storing circuit 33 to the imaging signal read from the memory 36 and an overflow/underflow correcting circuit 49 constituted in the same manner as in FIG. 4.

Figure 10:
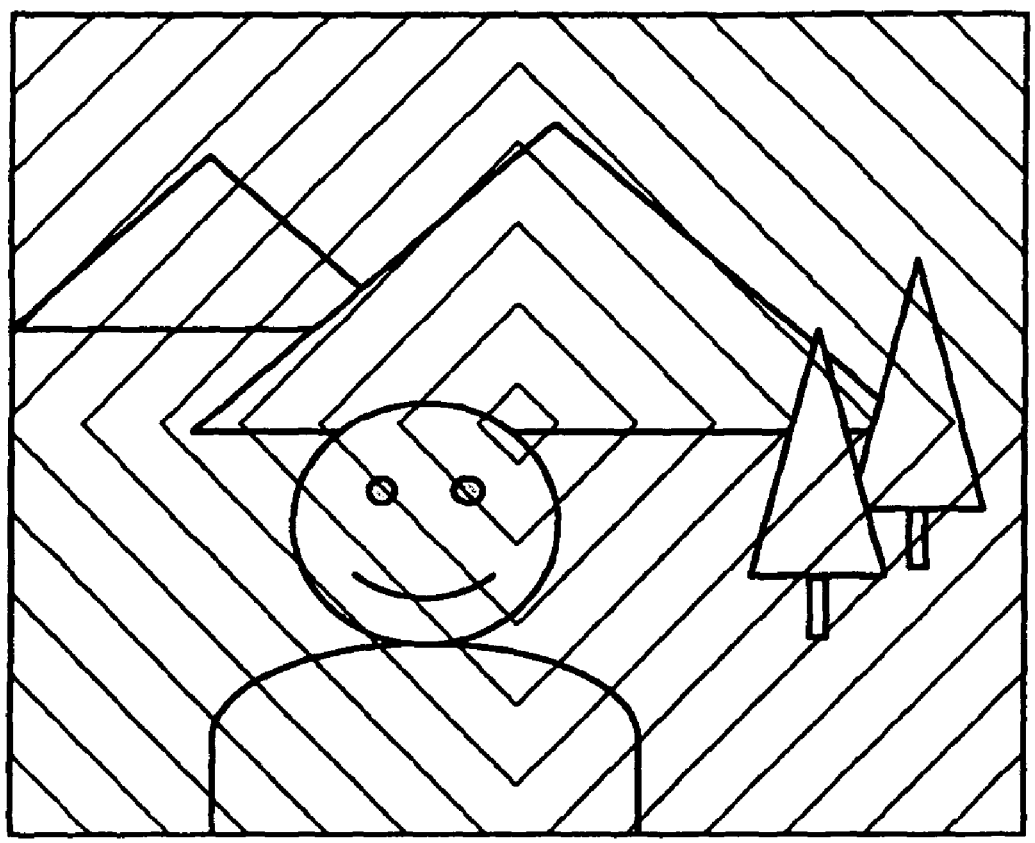
FIG. 10 shows an area-dividing pattern in measuring and correcting the color temperature according to the second preferred embodiment.

FIG. 10 shows an area-dividing pattern in a color temperature measuring circuit 32 according to the present preferred embodiment. A reference symbol a3 shows an area-dividing pattern in which concentric tilted squares having different sizes and having a shape similar to the opening shape of the aperture of the aperture mechanism 50 are combined. In the present embodiment, the measurement areas and the correction areas both have the pattern of the concentric tilted squares. The color temperature correcting circuit 34 corrects the color temperature of the imaging signal based on the correction data in the area in which the color temperature measurement is carried out.

The image of the photographic subject transmits through the IR cut filter 12 via the optical lens 11 to be consequently image-formed on the image sensor 13 after the amount of the incident light is adjusted by operating the aperture blades 50a and 50b in the aperture mechanism 50. Then, the digital signal from the A/D converter 15 is stored in the memory 36 via the memory control circuit 37 based on a control signal of an input address control circuit 31 and inputted to the color temperature measuring circuit 32 through the area division as shown in the pattern a3 of the concentric tilted squares. The color temperature measuring circuit 32 measures the color temperature per divided area in the pattern a3 of the concentric tilted squares, generates the correction data for correcting the color temperature of the imaging signal per divided area, and stores the generated correction data in the measurement result storing circuit 33.

After all of the correction data are stored in the measurement result storing circuit 33, the memory control circuit 37 reads the imaging signal stored in the memory 36 in accordance with the output address control circuit 38 and transfers the read imaging signal to the color temperature correcting circuit 34. The color temperature correcting circuit 34 adds the correction data from the measurement result storing circuit 33 to the imaging signal read from the memory 36 in the adder 42. The color temperature correcting circuit 34 further clips the data beyond the bit range in the overflow/underflow correcting circuit 49 and outputs the resulting data. Any other operation is executed in the same manner as in the first preferred embodiment, and therefore, is not described here again.

Figure 31:
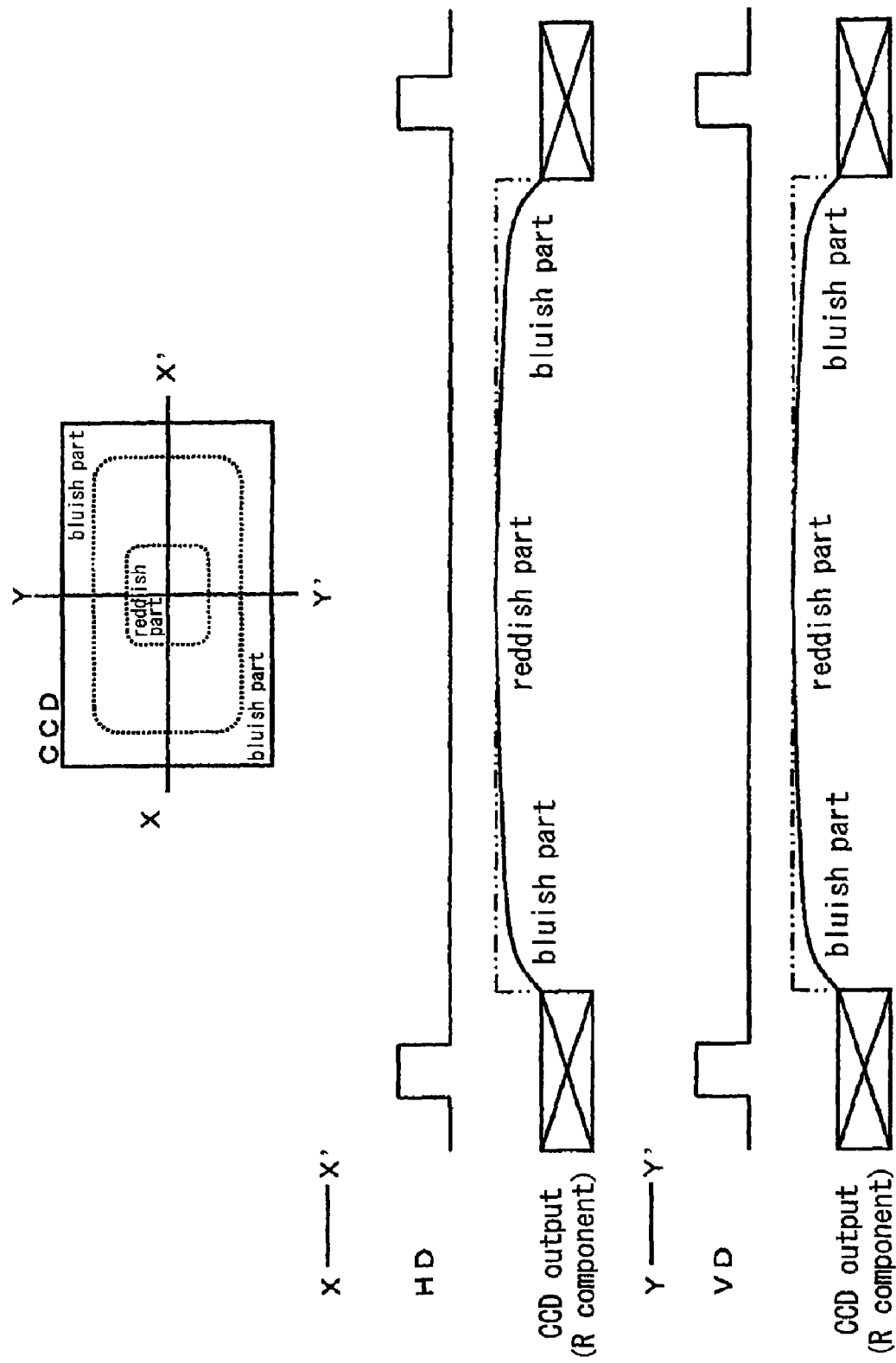
FIG. 31 is an illustration of color temperature shading.

As described, in the image input device according to the present embodiment, the measurement areas in the image sensor 13 are formed according to the pattern in which the concentric tilted squares having the different sizes and having the shape similar to the opening shape of the aperture are combined. In the pattern, the respective tilted squares are equivalently developed from a center of an entire area leftward, rightward, upward and downward, while the transmission property of the IR cut filter from the screen center toward the periphery of the screen shows the symmetry in both of the horizontal and vertical directions as described in FIG. 31. To put it differently, the pattern of the concentric tilted squares corresponds to the transmission property of the IR cut filter.

In the case of the first preferred embodiment, as shown in FIG. 5, the measurement areas constitute a group of horizontally and vertically grid-like 10×8 blocks, while the correction areas constitute a group of horizontally and vertically grid-like 5×4 blocks. The patterns in the drawing result from the simple parallel division of the entire area in the horizontal and vertical directions, wherein the individual areas are not particularly related to one another. Because of that, a large number of areas (blocks) are required. In contrast, in the case of the pattern comprising the concentric tilted squares, the four directions, which are the left, right, upper and lower directions, are equivalent provided that the distances from the center in the respective directions are equal to one another, and the number of the areas is 12.

The first preferred embodiment includes the large number of correction areas and the resultant large number of correction coefficients, wherein the processings are complicated, and the circuit size is increased. On the contrary, the number of the correction areas is reduced, and the number of the correction coefficients is accordingly reduced in the present embodiment, wherein the processings are simplified, and the circuit size can be reduced. It is needless to say that the effect attained in the first preferred embodiment can also be exerted in the present embodiment.

In the present embodiment, it is described that the measurement areas and the correction areas are identical, however, may be different. In the case of necessarily downsizing the circuits, in particular, it is desirable to reduce the number of the correction coefficients by arranging the correction area to be larger than the measurement area. An example of a possible constitution is that the color temperature is measured for each of the entire tilted squares but the color temperature is corrected in every other tilted square in the constitution of FIG. 10.

The present embodiment is suitable for the correction of the color-temperature shading in a DC state resulting from the color temperature corresponding to the transmission property of the IR cut filter, that is the color-temperature shading generated in such manner as an offset variation having a level different at each address of the imaging signal, because the adder 42 is used in the color temperature correcting circuit 34.

Third Preferred Embodiment

In a third preferred embodiment of the present invention, the measurement areas and the correction areas are formed according to a pattern of concentric circular shapes. A basic constitution of an image input device according to the present embodiment is the same as the constitutions shown in FIGS. 1 and 3.

Figure 11:
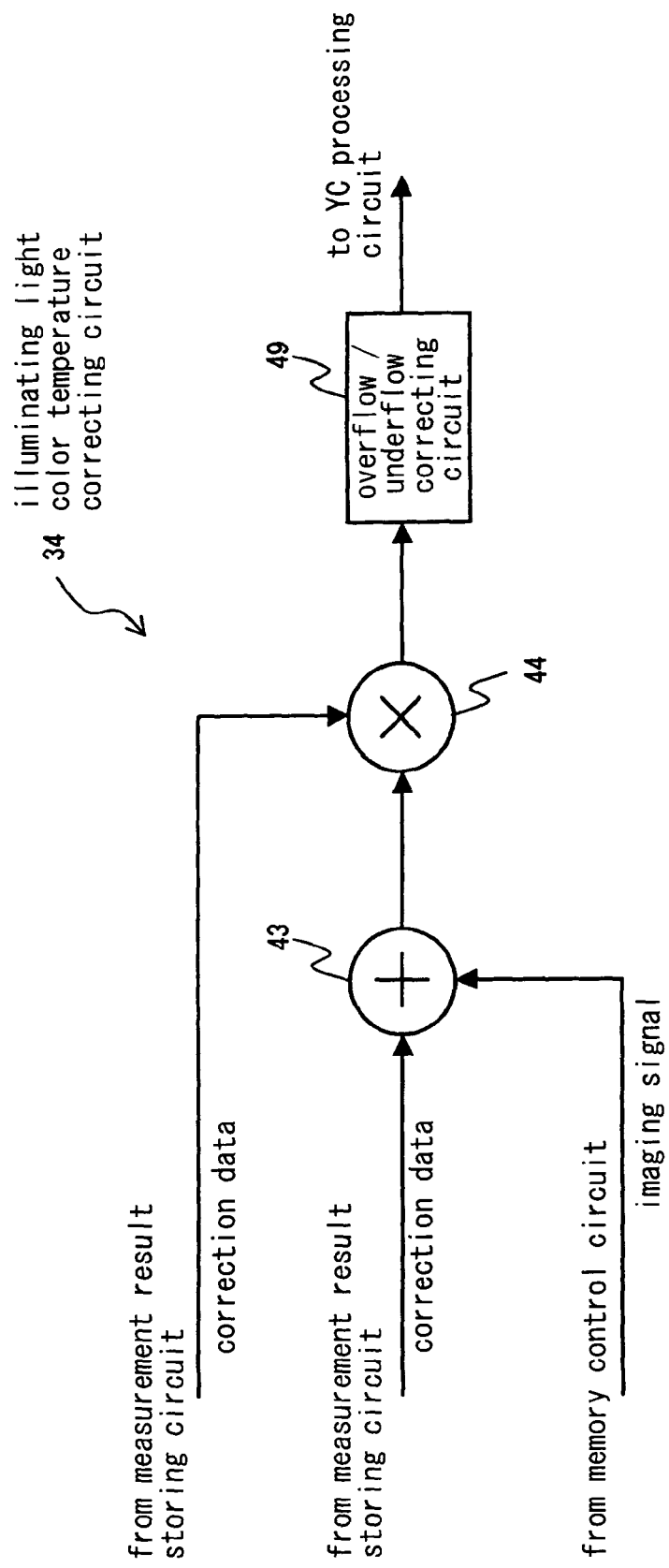
FIG. 11 is a block diagram illustrating a constitution of a color temperature correcting circuit according to a third preferred embodiment of the present invention.

FIG. 11 is a block diagram illustrating a constitution of a color temperature correcting circuit 34 according to the third preferred embodiment. The color temperature correcting circuit 34 comprises an adder 43 for adding the correction data from a measurement result storing circuit 33 to the imaging signal read from a memory 36, a multiplier 44 for multiplying the correction data from the measurement result storing circuit 33 by a result of the operation from the adder 43, and an overflow/underflow correcting circuit 49 constituted as described earlier.

Figure 12:
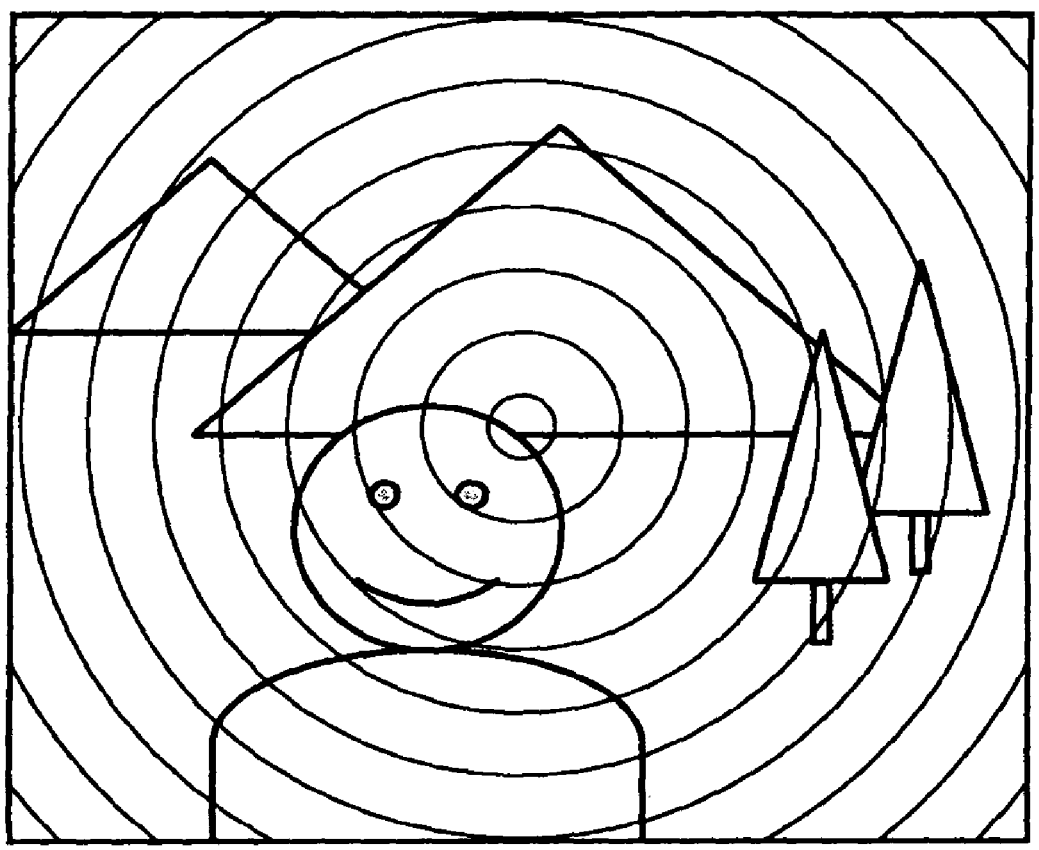
FIG. 12 shows an area-dividing pattern in measuring and correcting the color temperature according to the third preferred embodiment.

FIG. 12 shows an area-dividing pattern in a color temperature measuring circuit 32 according to the present embodiment, wherein the area division according to the pattern of the concentric circular shapes as shown in a pattern a4 is shown. In the case of the present embodiment, the measurement areas and the correction areas are both formed according to the pattern of the concentric circular shapes.

The image of the photographic subject transmits through an IR cut filter 12 via an optical lens 11 and image-formed on an image sensor 13. The digital signal from an A/D converter 15 is stored in the memory 36 via a memory control circuit 37 based on a control signal from an input address control circuit 31 and inputted to the color temperature measuring circuit 32 through the area division as in the pattern a4 of the concentric circular shapes. The color temperature measuring circuit 32 measures the color temperature per divided area of the pattern a4 of the concentric circular shapes, generates the correction data used for the color temperature correction with respect to the imaging signal per divided area, and stores the generated correction data in the measurement result storing circuit 33.

After all of the correction data are stored in the measurement result storing circuit 33, the memory control circuit 37 reads the imaging signal stored in the memory 36 in accordance with an output address control circuit 38 and transfers the read imaging signal to the color temperature correcting circuit 34. The color temperature correcting circuit 34 adds the correction data from the measurement result storing circuit 33 to the imaging signal read from the memory 36 in the adder 43, and multiplies the correction data from the measurement result storing circuit 33 by a result of the operation by the adder 43 in the multiplier 44. The data beyond the bit range in a result of the operation by the multiplier 44 is subjected to the clipping processing in the overflow/underflow correcting circuit 49 and outputted. Any other operation is executed in the same manner as in the first preferred embodiment, and therefore, is not described here again.

As described, in the image input device according to the present embodiment, the color temperature is measured and corrected according to the pattern of the concentric circular shapes similar to the pattern of the concentric tilted squares in the second preferred embodiment. Therefore, the number of the correction areas is smaller, the number of the correction coefficients is accordingly smaller, the processings are simplified, and the circuit size can be reduced in comparison to the first preferred embodiment. It is needless to say that the effect attained in the first preferred embodiment can be exerted in the present embodiment.

In the present embodiment, it is described that the measurement areas and the correction areas are identical, however, may be different. In the case of necessarily downsizing the circuits, in particular, it is desirable to reduce the number of the correction coefficients by arranging the correction area to be larger than the measurement area. An example of a possible constitution is that the color temperature is measured for each of the entire concentric circles but the color temperature is corrected in every other concentric circle in the constitution of FIG. 12.

The present embodiment is suitable for the correction of not only the color-temperature shading in the DC state resulting from the color temperature corresponding to the transmission property of the IR cut filter, that is the color temperature shading generated in such manner as the offset variation having the level different at each address of the imaging signal, but also the color-temperature shading in the AC state, that is the color temperature shading generated in such manner as the gain variation having the level different at each address of the imaging signal, because the adder 42 and the multiplier 44 are used in the color temperature correcting circuit 34.

Fourth Preferred Embodiment

In a fourth preferred embodiment of the present invention, the measurement areas are formed according to a pattern of linear-state shapes, while the correction areas are formed according to the of the concentric circular shapes. A basic constitution of an image input device according to the present embodiment is not any different to the constitutions shown in FIGS. 1, 3 and 4.

FIG. 13 shows an area-dividing pattern of the measurement areas in a color temperature measuring circuit 32 according to the present embodiment, wherein a linear-state area a5 elongated in the horizontal direction passing through the center of the entire area of the image sensor 13 and a linear-state area a6 elongated in the vertical direction also passing through the center of the entire area are set. The linear-state areas a5 and a6 both have a width of at least one pixel.

The correction areas are formed according to the pattern of the concentric circular shapes in the same manner as in FIG. 12 of the third preferred embodiment.

The color temperature measuring circuit 32 interpolates the color temperature measurement results obtained in the linear-state measurement areas a5 and a6 in estimate information corresponding to the pattern a4 divided in the concentric circular shapes. In other words, the measurement areas according to the pattern of the concentric circular shapes shown in FIG. 12 cover the entire area of the image sensor 13. In contrast to that, the linear-state areas a5 and a6 shown in FIG. 13 fail to cover the entire area, only covering a minor part of the entire area. More specifically, the entire area includes parts whose measurement values are not obtained (non-measurement areas) b1, b2, b3 and b4. Therefore, the color temperature measuring circuit 32 supplements the correction data in the non-measurement areas b1, b2, b3 and b4 with the color temperature measurement results obtained in the linear-state areas a5 and a6.

The digital signal from the A/D converter 15 is stored in a memory 36 via a memory control circuit 37 based on a control signal from an input address control circuit 31, and inputted to the color temperature measuring circuit 32 through the area division in the linear-state areas a5 and a6. The color temperature measuring circuit 32 measures the color temperature for each of the divided areas of the linear-state areas a5 and a6 and generates the correction data for the color temperature correction with respect to the imaging signal per divided area. The color temperature measuring circuit 32 further supplements the correction data in non-measurement areas b1, b2, b3 and b4, and then, stores the correction data of the entire area in a measurement result storing circuit 33. Any other operation is executed in the same manner as described earlier. In a color temperature correcting circuit 34, the color temperature is corrected with respect to the correction areas according to the pattern of the concentric circular shapes.

As described, according to the present embodiment, the effect achieved by the third preferred embodiment can be exerted, and the circuit size can be further reduced because the correction data in the parts whose the measurement values are not obtained are supplemented.

Fifth Preferred Embodiment

In a fifth preferred embodiment of the present invention, the color temperature is corrected in a state in which an influence from lens shading is avoided.

Figure 14:
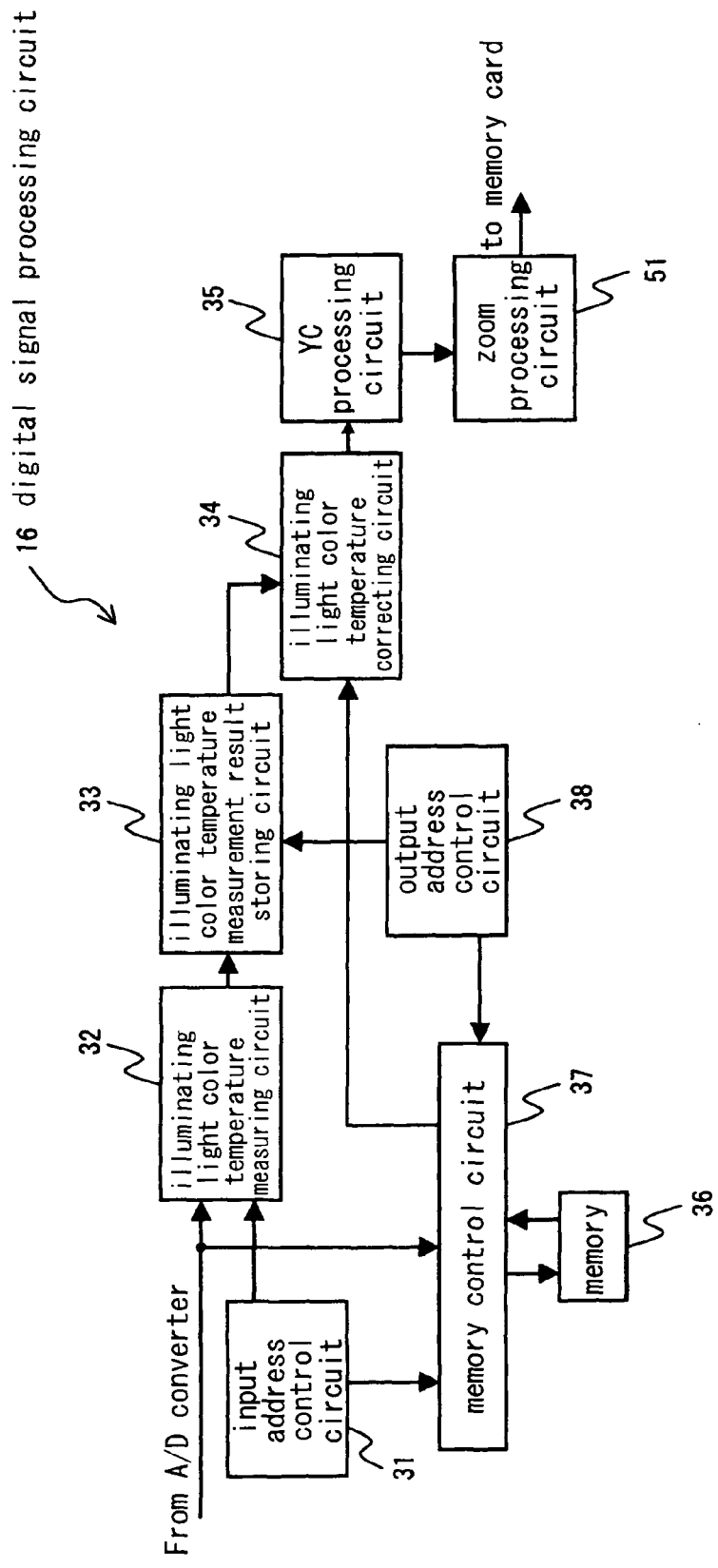
FIG. 14 is a block diagram illustrating a constitution of a digital signal processing circuit according to a fifth preferred embodiment of the present invention.

A basic constitution of an image input device according to the present embodiment is the same as the constitutions shown in FIGS. 1 and 4. FIG. 14 is a block diagram illustrating a constitution of a digital signal processing circuit 16 according to the present embodiment, wherein the constitution shown in FIG. 1 is further provided with a zoom processing circuit 51 for filtering a video signal outputted from a YC processing circuit 35 and interpolating/thinning pixels.

FIG. 15 shows an area-dividing pattern in a color temperature measuring circuit 32 according to the present embodiment. A standard entire area S1 is divided into two areas by a relatively large circular borderline q1 centered on the center of the entire area of the image sensor 13. On an inner side of the borderline q1 is an area a7 less affected by the lens shading, which is shading due to an optical lens 11, while, on an outer side thereof is an area a8 more affected by the lens shading.

In the digital signal from an A/D converter 15, the inner-side area a7 is discriminated in the color temperature measuring circuit 32 in accordance with an address from an input address control circuit 31. The inner-side area a7 is area-divided as in the pattern a4 of the concentric circular shapes shown in FIG. 12. Then, the color temperature is measured in each of the areas, and the correction data for correcting the color temperature of the imaging signal in a reduced screen area S2 is generated based on the obtained color temperature measurement result and stored in a measurement result storing circuit 33.

After all of the correction data of the reduced screen area S2 are stored in the measurement result storing circuit 33, a memory control circuit 37 reads the imaging signal stored in a memory 36 in accordance with an output address control circuit 38 and transfers the read imaging signal to a color temperature correcting circuit 34. The color temperature correcting circuit 34 corrects the imaging signal read from the memory 36 using the correction data from the measurement result storing circuit 33 in the reduced screen area S2. The correction data only relates to the inner-side area a7 less affected by the lens shading. The correction may be executed by the color temperature correcting circuit 34 in the same manner as described in any of the first through fourth preferred embodiments. The output signal color-temperature-corrected by the color temperature correcting circuit 34 in the reduced screen area S2 is synthesized for each different chrominance signal in the YC processing circuit 35, and the processing for obtaining the video signal is executed thereto. The resulting signal is outputted to the zoom processing circuit 51.

The zoom processing circuit 51 filters the video signal in the reduced screen area S2 outputted from the YC processing circuit 35 using a digital filter and supplementarily inserts the pixels into the video signal so that an image size of the reduced screen area S2 is enlarged into an image size of the standard entire area S1. A result of the enlargement process is outputted to a memory card 17 to be recorded therein. Any other operation is executed in the same manner as described earlier.

As described, according to the present embodiment, the color temperature of the imaging signal less affected by the lens shading is corrected. As a result, the color temperature shading can be adequately corrected avoiding any influence from the lens shading and largely depending on the conditions of the color temperature and the positional relationship between the lens and the image sensor.

Sixth Preferred Embodiment

A sixth preferred embodiment of the present invention includes renewal of the correction data. If a simple gain correction is employed based on the color temperature measurement result when the imaging signal of a high level is inputted to the color temperature correcting circuit 34, the signal value goes beyond the dynamic range and clipped at a maximum value which can be represented by specified bits. As a result, a color component is gain-corrected for the amount of the correction data, while a different color component fails to be gain-corrected for the amount of the correction data, thereby being clipped at a certain value. Then, hues of the imaging signal are significantly shifted, which results in a deteriorated image quality. The present embodiment includes a measure for preventing the foregoing unfavorable state.

Figure 16:
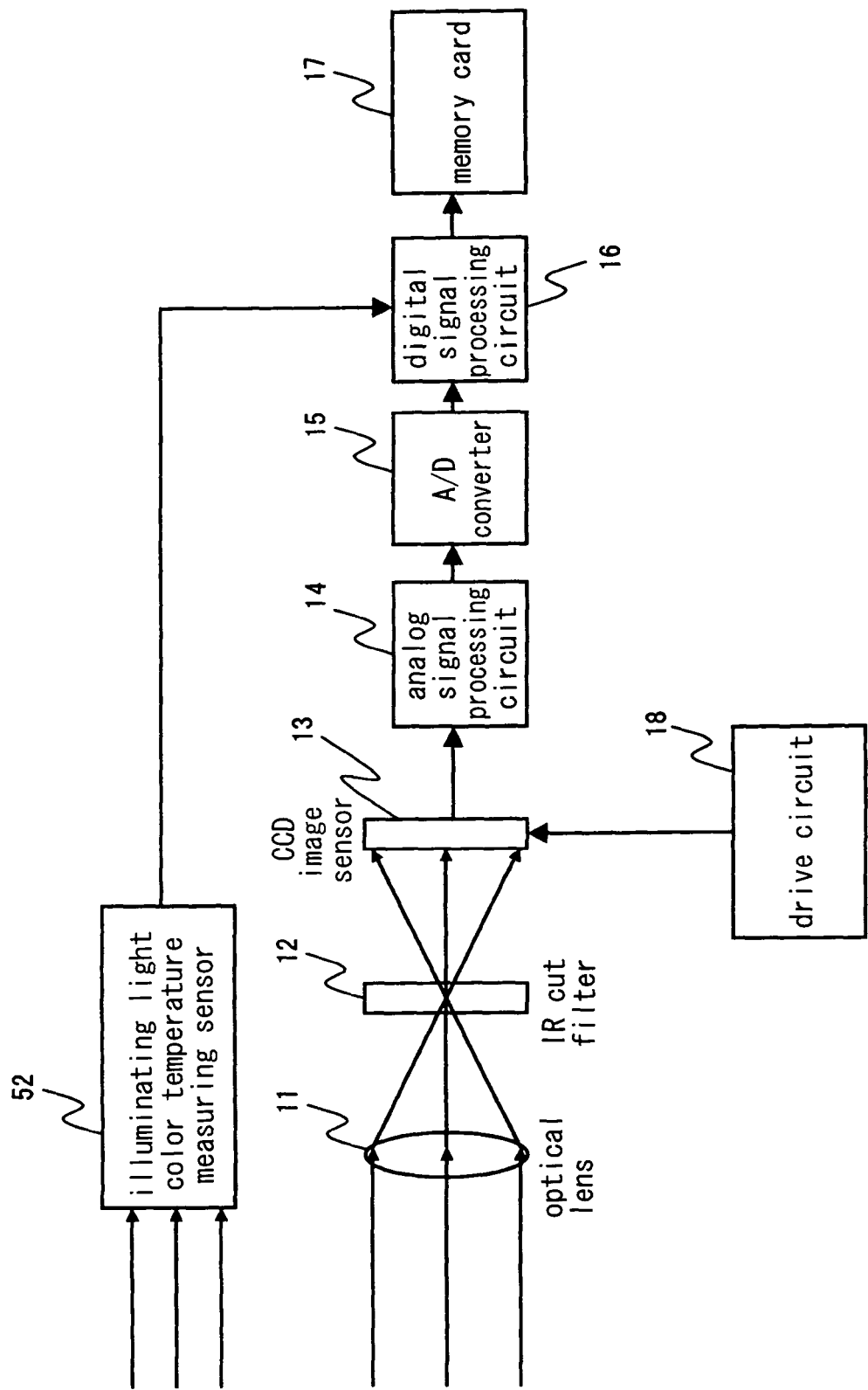
FIG. 16 is a block diagram illustrating a constitution of an image input device according to a sixth preferred embodiment of the present invention.

FIG. 16 is a block diagram illustrating a constitution of an image input device according to the sixth preferred embodiment. The image input device according to the present embodiment is further provided with an illuminating light color temperature measuring sensor 52 for measuring the color temperature of the illuminating light of the photographic subject and outputting a result of the measurement to a digital signal processor 16 in the constitution shown in FIG. 1. The color temperature measuring sensor 52 corresponds to the color temperature measuring circuit 32 shown in FIG. 3.

The color temperature measuring sensor 52 is different to the color temperature measuring circuit 32 in directly reading the color temperature from the photographic subject without using the imaging signal from the image sensor, while the color temperature measuring circuit 32 measures the color temperature using the imaging signal obtained from the image sensor. The present embodiment is described referring to the color temperature measuring sensor 52, however, the color temperature measuring circuit 32 can also be used without any problem. There is no large difference between the two components when used in order to measure the color temperature, which applies to the following embodiments as well.

Figure 17:
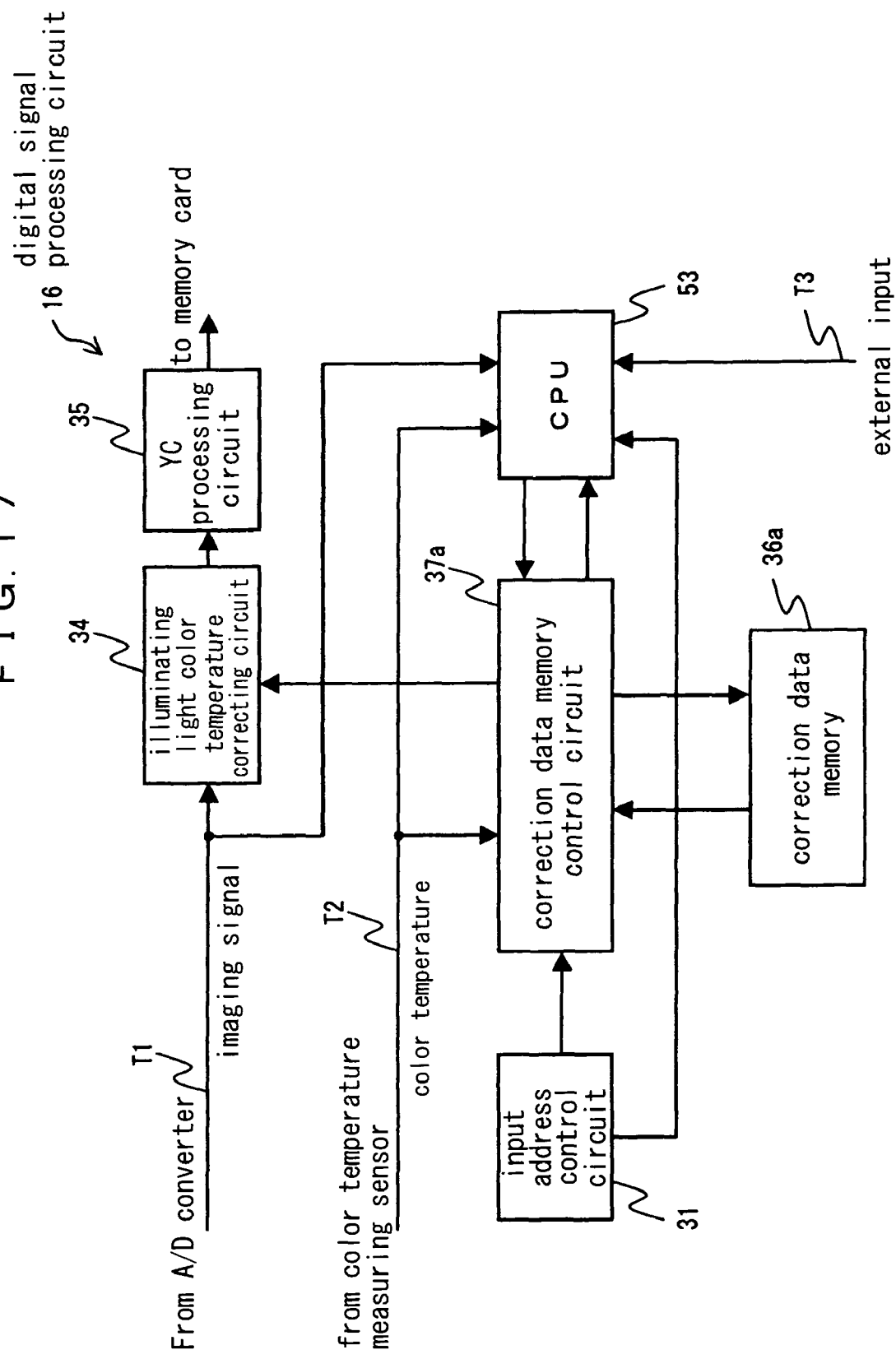
FIG. 17 is a block diagram illustrating a constitution of a digital signal processing circuit according to the sixth preferred embodiment.

FIG. 17 is a block diagram illustrating a constitution of a digital signal processing circuit 16 according to the present embodiment. The digital signal processing circuit 16 comprises a color temperature correcting circuit 34, a YC processing circuit 35, an input address control circuit 31, a correction data memory control circuit 37a, a correction data memory 36a, and a CPU 35 as a microprocessor. The input address control circuit 31 and the YC processing circuit 35 are constituted in the same manner as described earlier.

The CPU 53 inputs the address of the imaging signal from the input address control circuit 31 when an external command is inputted from an input terminal T3 and inputs the digitally-converted imaging signal from the A/D converter 15 via an input terminal T1. The CPU 53 further inputs the color temperature measurement result from the color temperature measuring sensor 52 via an inter terminal T2 and further inputs the correction data (correction coefficient) for correcting the color temperature from the correction data memory 36a via the correction data memory control circuit 37a based on the inputted address and the color temperature measurement result. Then, the CPU 53 revises the correction data based on the address, imaging signal and color temperature measurement result, and again writes the revised correction data in the correction data memory 36a via the correction data memory control circuit 37a so as to renew the data therein.

The correction data memory control circuit 37a reads the correction data from the correction data memory 36a based on a control signal from the CPU 53 and transfers the read correction data to the CPU 53, and further, writes the data outputted from the CPU 53 in the correction data memory 36a.

The correction data memory 36a stores therein the color temperature correction data (correction coefficient) in which the address and the color temperature of the imaging signal are made into the parameters. The memory control circuit 37a accesses the correction data memory 36a based on the address of the imaging signal from the input address control circuit 31 and the color temperature measurement result from the input terminal T2 so that the appropriate correction data can be read.

FIG. 18 is a block diagram illustrating a constitution of a color temperature correcting circuit 34 according to the sixth preferred embodiment. The color temperature correcting circuit 34 synthesizes the correction data read from the correction data memory 36a via the correction data memory control circuit 37a into the imaging signal inputted in accordance with the output of the memory control circuit 37a to thereby correct the color temperature of the imaging signal.

The color temperature correcting circuit 34 comprises a multiplier 45 for multiplying the imaging signal inputted from the A/D converter 15 by the correction data from the correction data memory 36a and an overflow/underflow correcting circuit 49 for clipping underflow/overflow values in a result of the operation by the multiplier 45 and controlling the operation result to stay within the predetermined bit range.

The color temperature of the illuminating light of the image of the photographic subject is measured by the color temperature measuring sensor 52, and the obtained color temperature measurement result is outputted to the digital signal processing circuit 16.

The digital signal processing circuit 16 executes the following operation based on the imaging signal from the A/D converter 15 and the color temperature measurement result from the color temperature measuring sensor 52. The digital signal processing circuit 16 requests the memory control circuit 37a to read the correction data using the color temperature measurement result and the address of the imaging signal from the input address control circuit 31 as parameters. The memory control circuit 37a reads the correction data from the correction data memory 36a based on the request using the address and the color temperature measurement result as keys and notifies the color temperature correcting circuit 34 of the read correction data. The color temperature correcting circuit 34 multiplies the imaging signal from the A/D converter 15 by the correction data from the correction data memory 36a in the multiplier 45, and clips the data beyond the bit range in the overflow/underflow correcting circuit 49 and outputs the resulting data. The output signal color-temperature-corrected in the color temperature correcting circuit 34 is synthesized based on the different chrominance signals in the YC processing circuit 35 so as to obtain the video signal. The video signal outputted from the YC processing circuit 35 is further outputted to a memory card 17 to be recorded therein. Any other operation is executed in the same manner as described earlier.

In an initialization stage when a produce is finalized, it is necessary to store the correction data (correction coefficient) in the correction data memory 36a. A command instructing the storage is supplied from the input terminal T3. The similar command is supplied in other than the initialization stage, that is a case in which the imaging signal digitally converted by the A/D converter 15 is inputted at a level too high relative to a limit of the dynamic range of specified bit numbers by which the digital data is represented in the color temperature correcting circuit 34.

The CPU 53 generates the correction data (correction coefficient) suitable for the color temperature correction in accordance with the imaging signal from the A/D converter 15, the address of the imaging signal from the input address control circuit 31 and the color temperature measurement result from the input terminal T2 when it is detected that the level of the imaging signal inputted from the A/D converter 15 is higher than a predetermined value and the command is inputted to the input terminal T3. The CPU 53 then writes the generated correction data in the correction data memory 36a via the memory control circuit 37a so as to renew the data therein. Thereby, the correction data (correction coefficient) for the color temperature correction is stored in the correction data memory 36a without the large shift of the hues.

In newly generating the correction data at the time of the renewal, the new correction data can be obtained as a result of calculation according to a predetermined program based on the address and the color temperature result of the imaging signal, or the new correction data can be obtained by correcting the correction data read from the correction data memory 36a in accordance with the imaging signal, address and color temperature measurement result. Which of the foregoing examples is adopted depends on the command.

As described, according to the present embodiment, the color temperature shading whose state is variable depending on the conditions of the color temperature and the positional relationship between the optical lens 11 and the image sensor 13 can be corrected in the same manner as described in the foregoing embodiments. Further, the CPU 53 can renew the correction data stepwise, which allows quite flexible responses to deal with drastic environmental changes, disturbances and the like.

In the foregoing description, the correction data is stored in the correction data memory 36a based on the address and the color temperature measurement result of the imaging signal, however, the correction data can be stored based on combined information including, for example, a type, focal distance and the like of the lens.

Further, when the color temperature is corrected, a look-up table in which corresponding data is used for replacement may be employed instead of employing the operation using the correction data from the correction data memory 36a and the imaging signal.

Seventh Preferred Embodiment

A seventh preferred embodiment of the present invention is aimed at curtailing a required memory capacitance by discretely storing the correction data in the correction data memory. A basic constitution of an image input device according to the present embodiment is the same as the constitutions shown in FIGS. 16, 17 and 18.

FIG. 19 is an illustration of the discreteness of the correction data stored in a correction data memory 36a according to the seventh preferred embodiment. The correction data memory 36a, instead of storing the correction data in relation to all of the addresses of the imaging signal from the image sensor 13, stores the correction data in the discrete manner at certain intervals in relation to some of the address of the imaging signal. Denoting all of the addresses with a reference symbol a9, the correction data is stored in the correction data memory 36a at the discrete addresses at equal intervals as shown with reference symbols a10.

In the absence of the correction data corresponding to the address from the input address control circuit 31 in the correction data memory 36a, the correction data memory control circuit 37a reads the correction data at an address adjacent to the address in the correction data memory 36a and transfers the read correction data to the CPU 53. The CPU 53 executes the interpolating process using the correction data at the adjacent address and uses the interpolated data as the correction data of the address of the imaging signal.

Below is given a more detailed description referring to FIGS. 20, 21 and 22.

Figure 20:
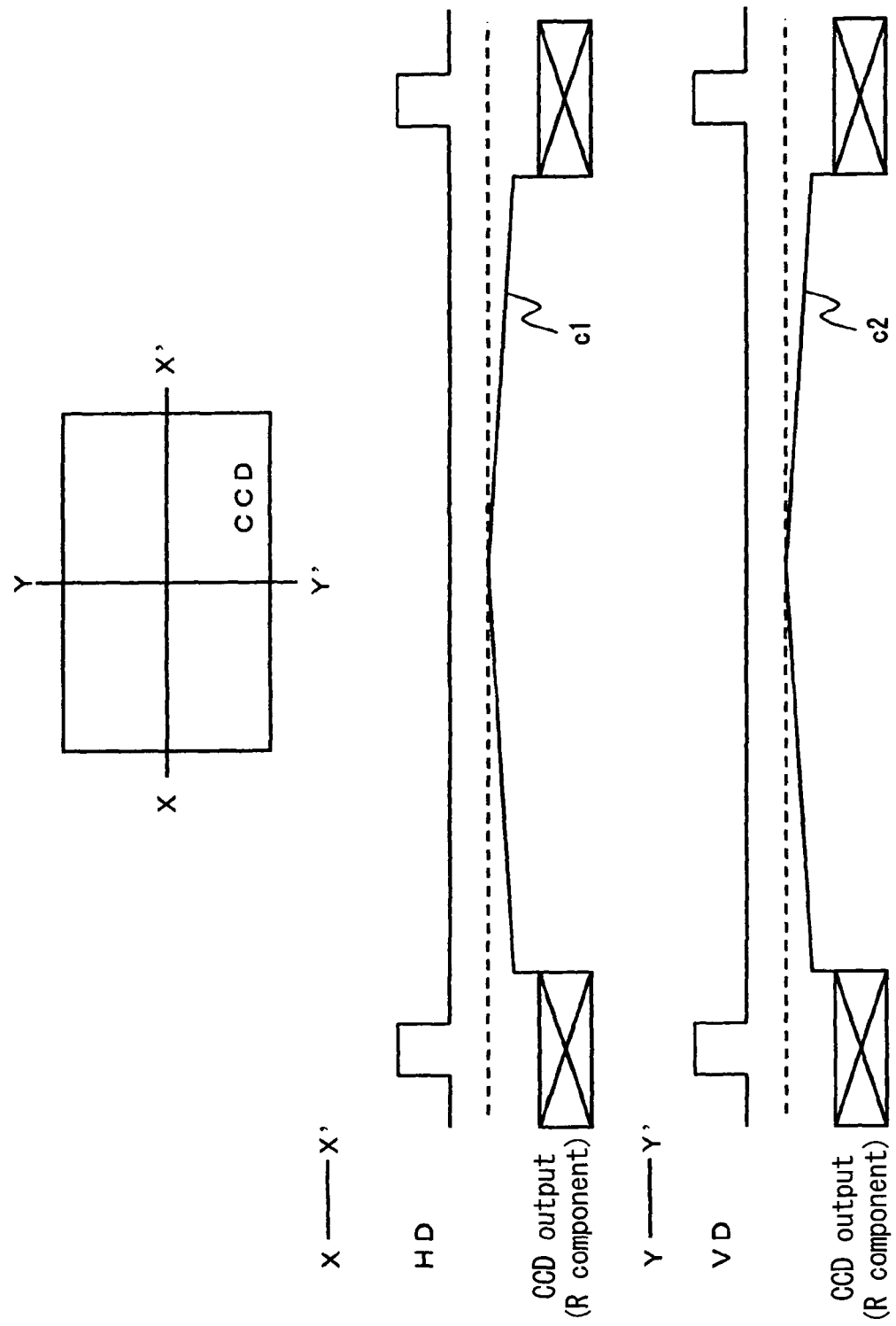
FIG. 20 is an illustration of data interpolation according to the seventh preferred embodiment.
Figure 21:
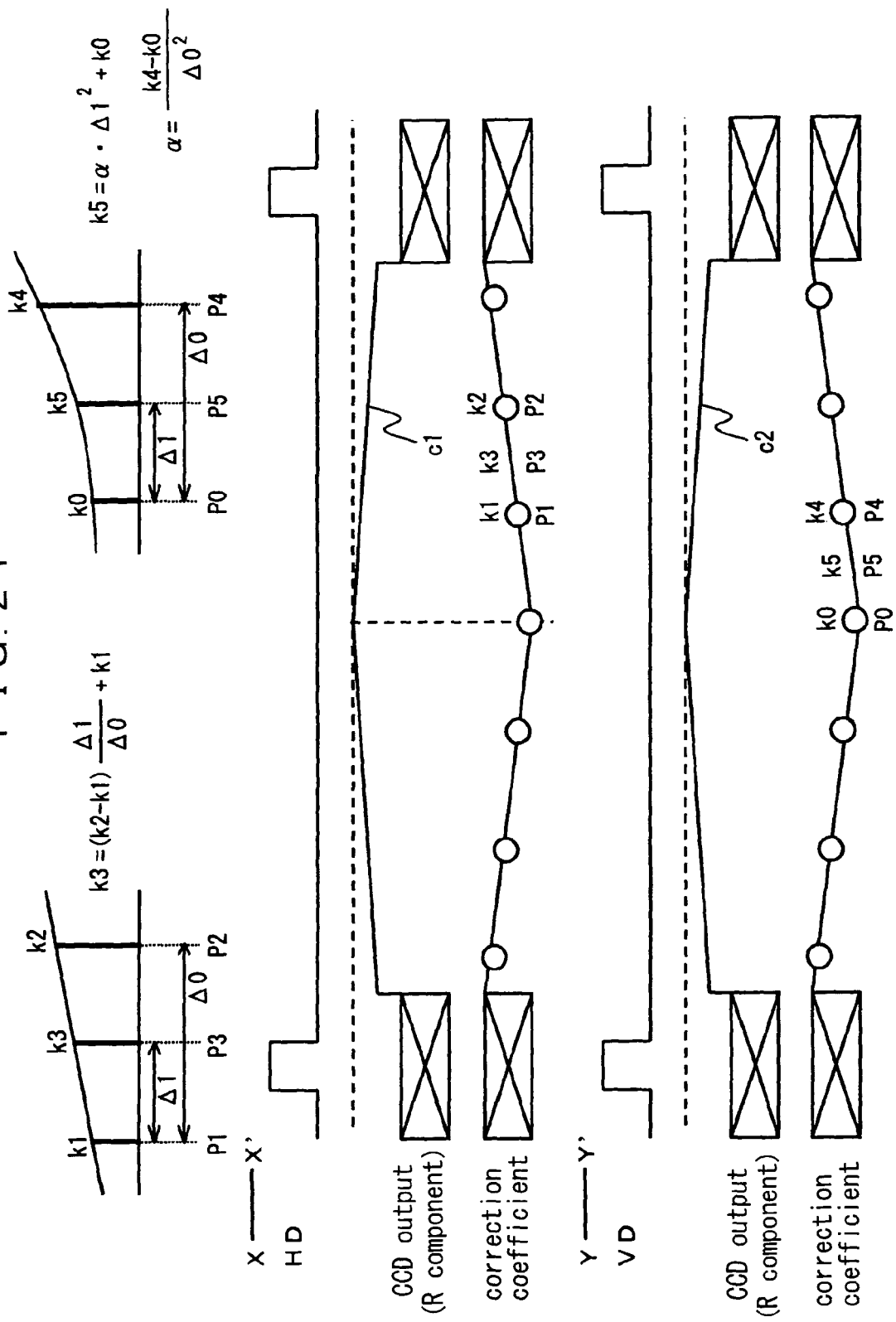
FIG. 21 is an illustration of the data interpolation according to the seventh preferred embodiment.

Assuming that the imaging signal contains the color-temperature shading characterized as shown by c1 and c2 in FIG. 20. As shown in FIG. 21, the correction data at an address p1 is referred to as k1, and the correction data at an address p2 is referred to as k2 here. When the address of the imaging signal to be corrected is p1, the correction data k1 is read from the correction data memory 36a, and the read correction data is directly used for the color temperature correction. When the address of the imaging signal to be corrected is p2, the correction data k2 is read from the correction data memory 36a, and the read correction data is directly used for the color temperature correction. However, the address is p3 between the addresses p1 and p2, the correction data corresponding to the address p3 is absent in the correction data memory 36a. Therefore, the correction data k1 at the address p1 and the correction data k2 at the address p2 are read, and the interpolating process is carried out using the two correction data k1 and k2.

In the case of using a direct function for the interpolation, a distance between the addresses p1 and p2 is referred to as $\Delta 0$, and, a distance between the addresses p1 and p3 is referred to as $\Delta 1$, then, correction data k3 at the address p3 is approximate by the following expression.

$$k3=\{\Delta 1 \cdot (k2-k1)/\Delta 0\}+k1$$

In the case of using a quadric function for the interpolation, the correction data at an origin address p0 is referred to as k0, and the correction data at an address p4 is referred to as k4, then, correction data k1 at an address p5 therebetween is approximate by the following expression.

$$\alpha=(k4-k0)/\Delta 0^2$$

$$k5=\alpha \cdot \Delta 1^2 + k0$$

Figure 22:
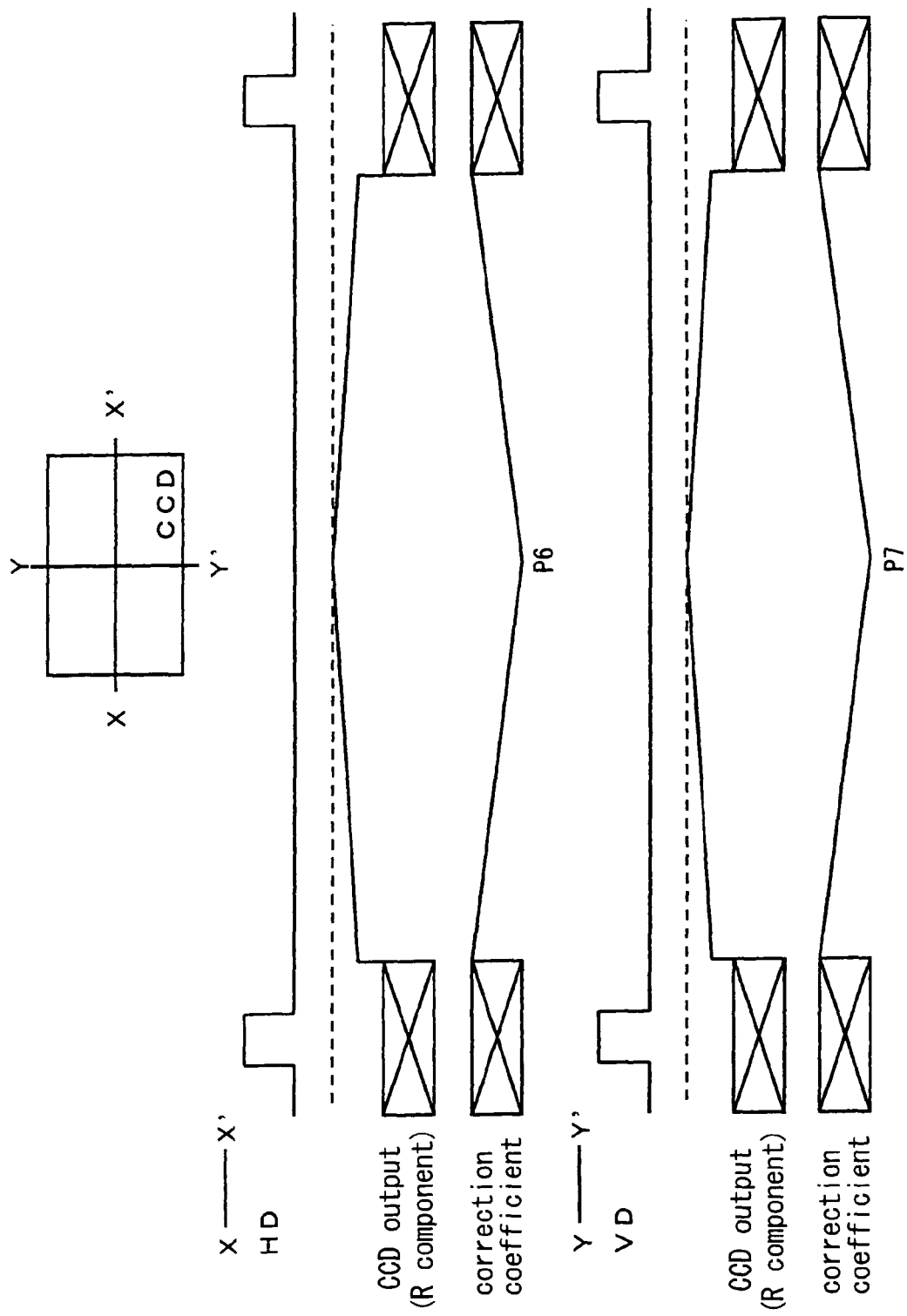
FIG. 22 is an illustration of the data interpolation according to the seventh preferred embodiment.

For reference, at continuous singular points characterized as shown by p6 and p7 in FIG. 22, the interpolating processes using the foregoing functions are not sufficient in order to properly carry out the correction. Therefore, the correction data corresponding to the singular points is stored in the correction data memory 36a and read whenever necessary.

The correction data for the interpolation calculated by the CPU 53 is supplied to the color temperature correcting circuit 34 via the correction data memory control circuit 37a, or may be supplied to the color temperature correcting circuit 34 directly from the CPU 53.

The color temperature correcting circuit 34 carried out the color temperature correction to the imaging signal from the A/D converter 15 based on the correction data read from the correction data memory 36a or the correction data interpolated by the CPU 53. Any other operation is executed in the same manner as described earlier.

As described, according to the present embodiment, the correction data is discretely stored in the correction data memory 36a at some of all of the addresses of the imaging signal. Further, any correction data not stored in the correction data memory 36a is obtained through the interpolation. Thereby, the memory capacity of the correction data memory 36a can be curtailed, and the circuits can be downsized.

The function used for the interpolation of the correction data may employ an appropriate function other than the direct function and the quadric function, or a combination of a plurality of functions.

Eighth Preferred Embodiment

An eighth preferred embodiment of the present invention is constituted in such manner that the influence from the lens shading is avoided in advance.

Figure 23:
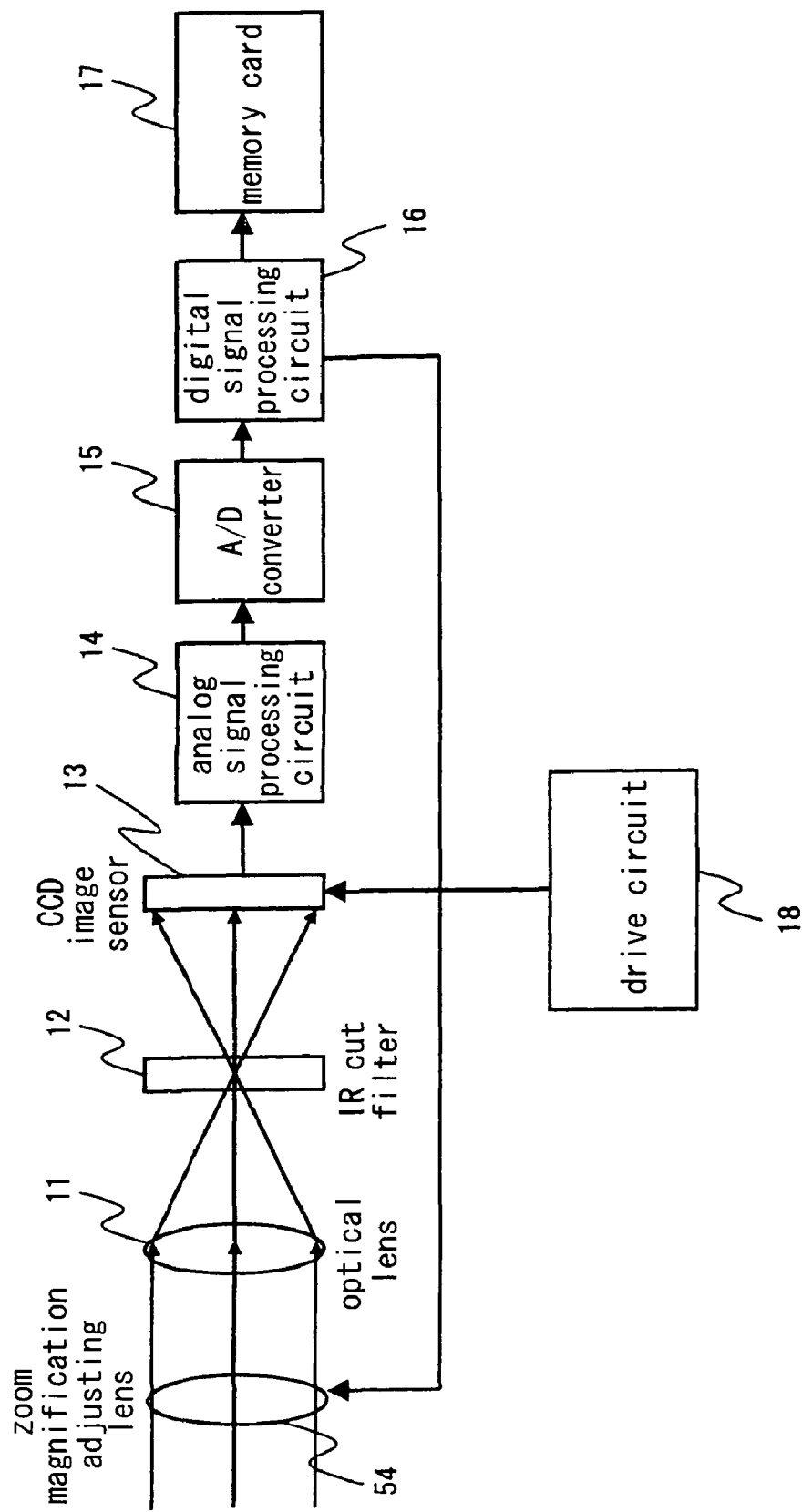
FIG. 23 is a block diagram illustrating a constitution of an image input device according to an eighth preferred embodiment of the present invention.

FIG. 23 is a block diagram illustrating a constitution of an image input device according to the eighth preferred embodiment. A zoom magnification adjusting lens 54 is disposed in a previous stage of the optical lens 11. The zoom magnification adjusting lens 54 optically enlarges and reduces a magnification of the photographic subject image-formed on the image sensor 13.

Figure 24:
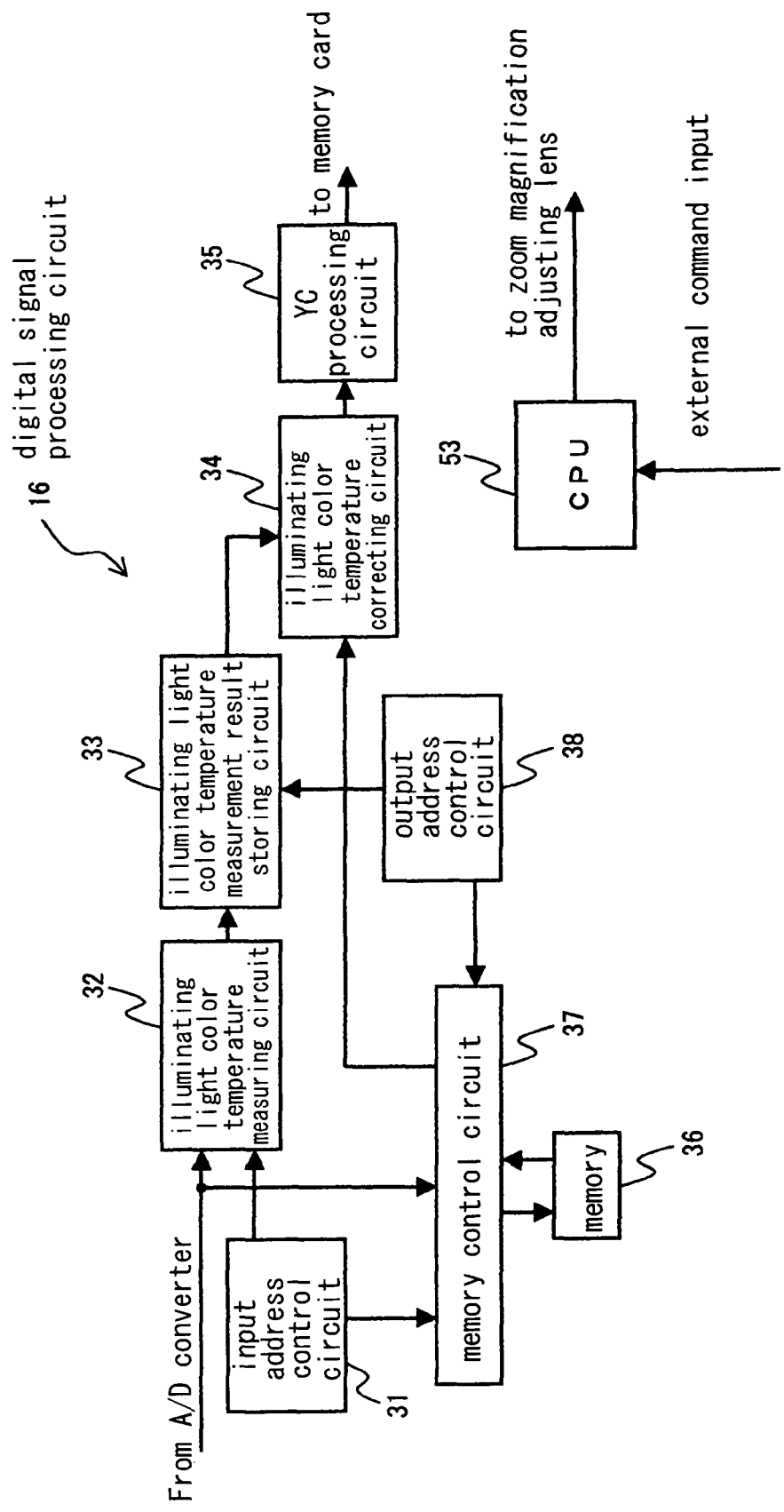
FIG. 24 is a block diagram illustrating a constitution of a digital signal processing circuit according to the eighth preferred embodiment.

FIG. 24 is a block diagram illustrating a constitution of a digital signal processing circuit 16 according to the eighth preferred embodiment. The CPU 53 is adapted to operate the zoom magnification adjusting lens 54 in response to the input of an external command.

The CPU 53, when detecting that a shutter is pressed down (release is pressed down), controls the zoom magnification adjusting lens 54 so that the image of the photographic subject is reduced to be image-formed on the image sensor 13 and retrieves the imaging signal. Thereafter, the image of the photographic subject is photographed and retrieved at an optical magnification intended by a photographer.

A color temperature correcting circuit 34 is constituted in the same manner as shown in FIG. 4. A color temperature measuring circuit 32 is adapted to execute its processing according to a pattern similar to the pattern shown in FIG. 15. The inner-side are a7 less affected by the lens shading is selected by the zoom magnification adjusting lens 54, and the processing in a4 shown in FIG. 12 is executed. Then, the correction data for the color temperature correction is used with respect to the imaging signal in the area S2.

When the photographer presses down the shutter, the CPU 53 controls the zoom magnification adjusting lens 54, and the image of the photographic subject is optically reduced and image-formed on the image sensor 13. The digital signal from the A/D converter 15 is subjected to the color temperature measurement by the color temperature measuring circuit 32 through the area division according to the pattern shown in FIG. 15. The correction data obtained based on the measurement result is stored in the measurement result storing circuit 33 (first operation).

After the first operation is completed, the CPU 53 controls the zoom magnification adjusting lens 54 so that the image of the photographic subject is image-formed on the image sensor 13 at the magnification intended by the photographer. Thereafter, the digital signal from the A/D converter 15 is stored in the memory 36 via the memory control circuit 37 in accordance with the input address control circuit 31 in the same manner (second operation).

After the second operation is completed, the memory control circuit 37 reads the imaging signal stored in the memory 36 in accordance with the output address control circuit 38 and transmits the read imaging signal to the color temperature correcting circuit 34. The memory control circuit 37 further reads the correction data corresponding to the current area of the imaging signal from the measurement result storing circuit 33 and transmits the read correction data to the color temperature correcting circuit 34 shown in FIG. 4. Any other operation is executed in the same manner as described earlier.

As described, according to the present embodiment, the color temperature of the imaging signal not affected by the lens shading, that is the imaging signal equivalent to a general angel of view, is measured and corrected. Therefore, the color temperature shading can be corrected with a high accuracy without any influence from the lens shading.

Ninth Preferred Embodiment

A ninth preferred embodiment of the present invention is characterized in that the influence from the lens shading is removed in a final stage of an information transmission path. A basic constitution of an image input device according to the present embodiment is the same as the constitutions shown in FIGS. 1, 4 and 17. The constitution according to the present embodiment corresponds to the constitution shown in FIG. 17 further provided with the zoom processing circuit 51 shown in FIG. 14, which is connected to a next stage of the YC processing circuit 35. The zoom processing circuit 51 filters the signal outputted from the YC processing circuit 35 and executes the pixel interpolating/thinning processes.

The color temperature measuring circuit 32 executes the processing according to the pattern shown in FIG. 12. The zoom processing circuit 51 cuts out only the imaging signal in which the color-temperature shading has been corrected and outputs the resulting imaging signal without executing the filtering process to the video signal outputted from the YC processing circuit 35 using the digital filter. The outputted signal is further outputted to the memory card 17 to be recorded therein.

As described, according to the present embodiment, the color temperature of the imaging signal not affected by the lens shading, that is the imaging signal equivalent to the general angel of view, is measured and corrected. Therefore, the color temperature shading can be corrected with a high accuracy without any influence from the lens shading.

Tenth Preferred Embodiment

A tenth preferred embodiment of the present invention is characterized in that an influence from a modulated sampling intensity of a specific color component caused by the color temperature shading is eliminated in the auto focus so as to realize a highly precise auto focus. A color temperature correcting circuit 34 according to the present embodiment is constituted in the same manner as shown in FIG. 4.

Figure 25:
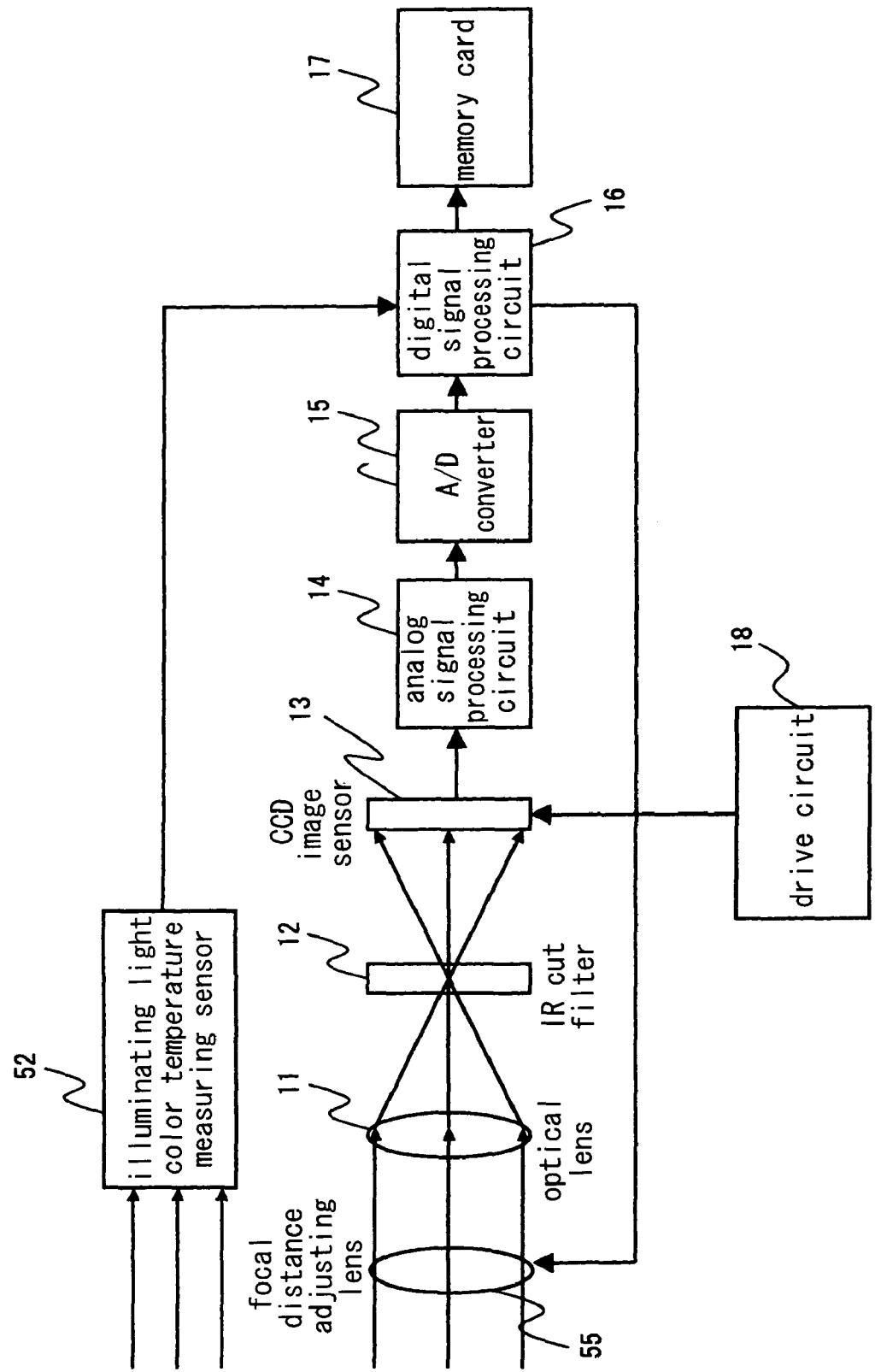
FIG. 25 is a block diagram illustrating a constitution of an image input device according to a tenth preferred embodiment of the present invention.

FIG. 25 is a block diagram illustrating a constitution of an image input device according to present embodiment. A focal distance adjusting lens 55 for adjusting a focal distance of the photographic subject image-formed on the image sensor 13 is provided in a previous stage of the optical lens 11.

Figure 26:
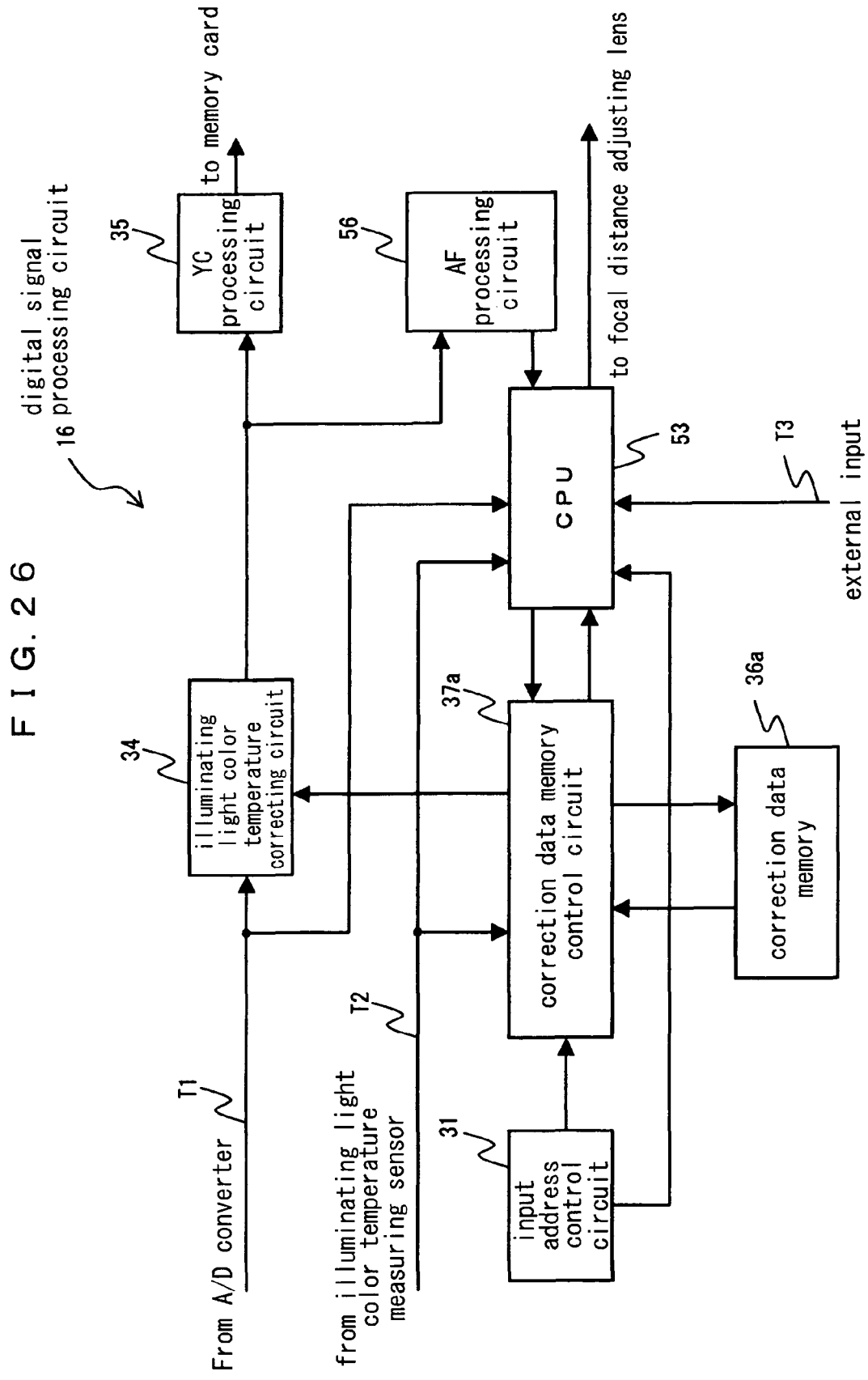
FIG. 26 is a block diagram illustrating a constitution of a digital signal processing circuit according to the tenth preferred embodiment.
Figure 27:
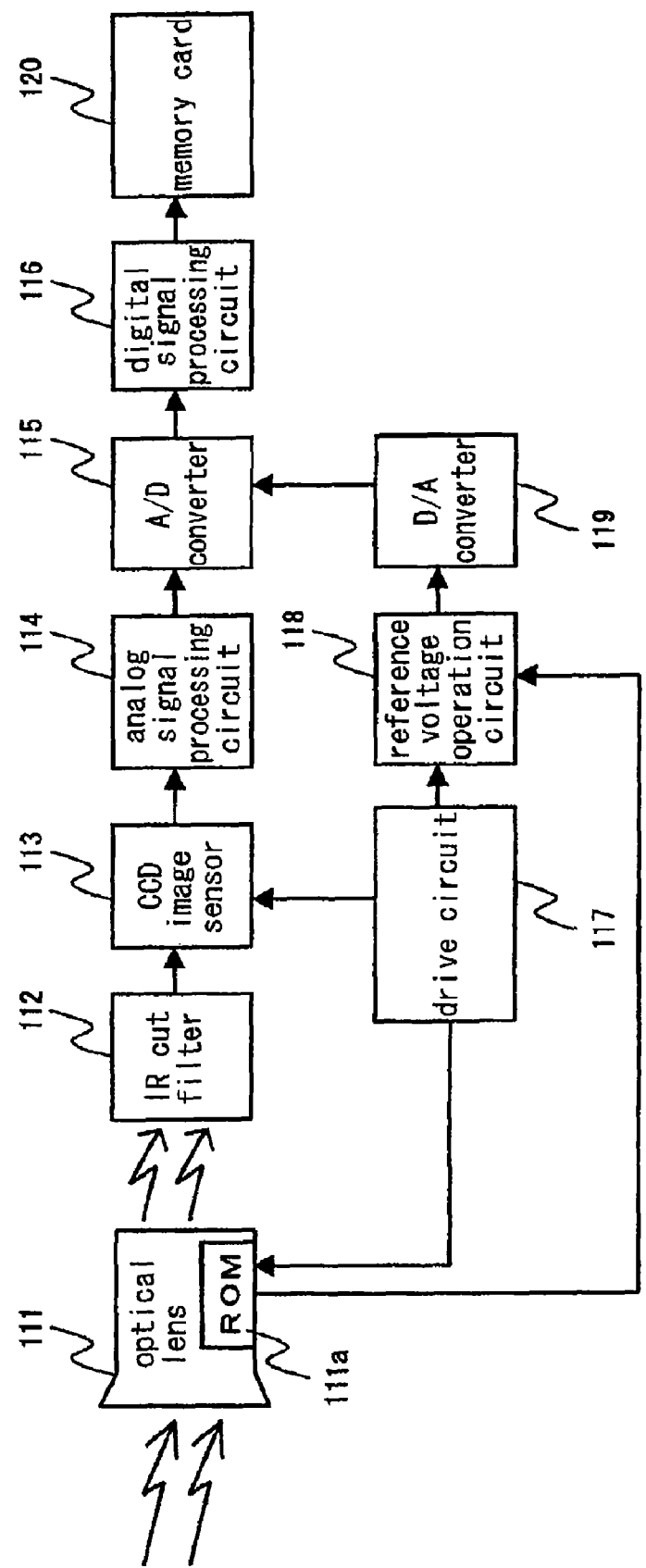
FIG. 27 is a block diagram illustrating a constitution of a conventional electronic still camera.
Figure 29:
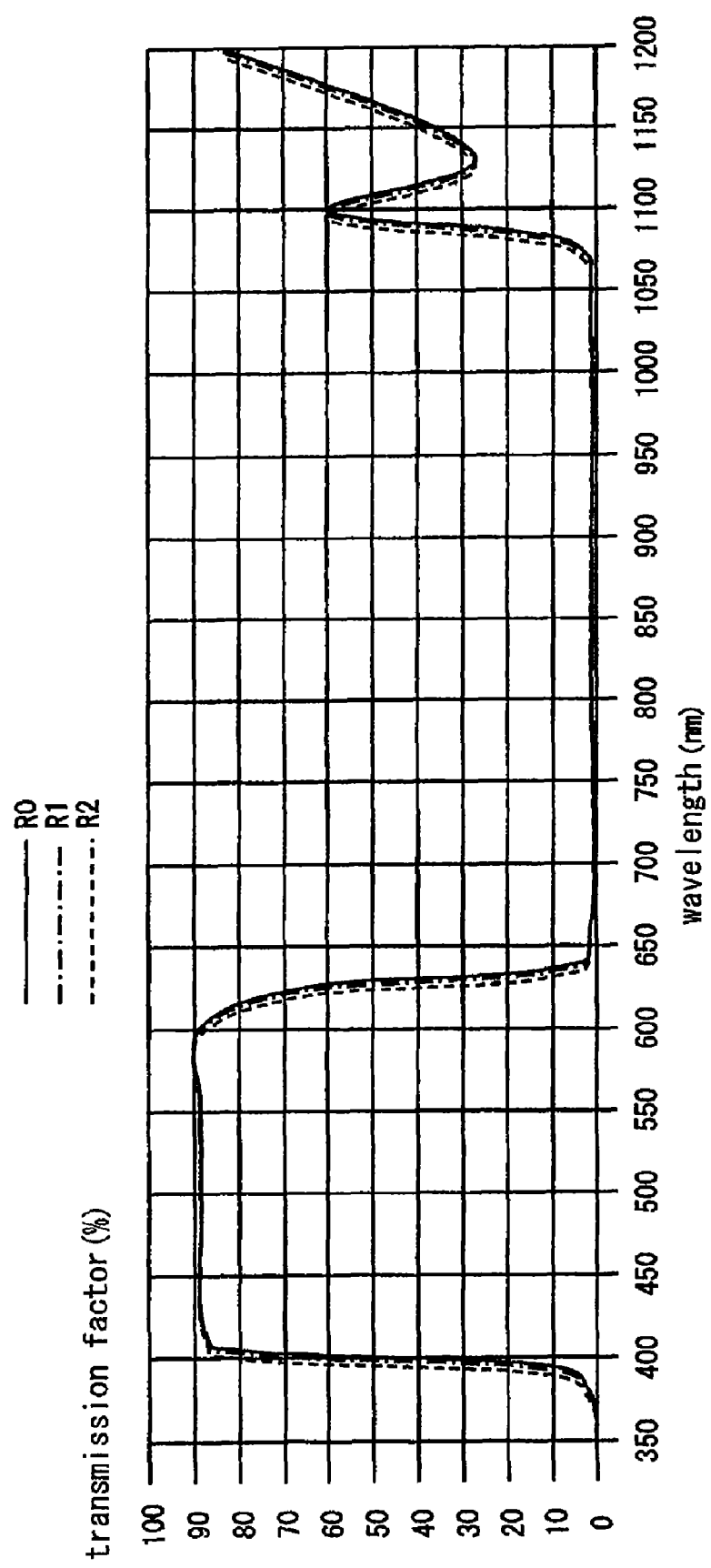
FIG. 29 is a wavelength-transmission factor property chart of an IR cut filter when there is a large distance between the optical lens and the image sensor.
Figure 30:
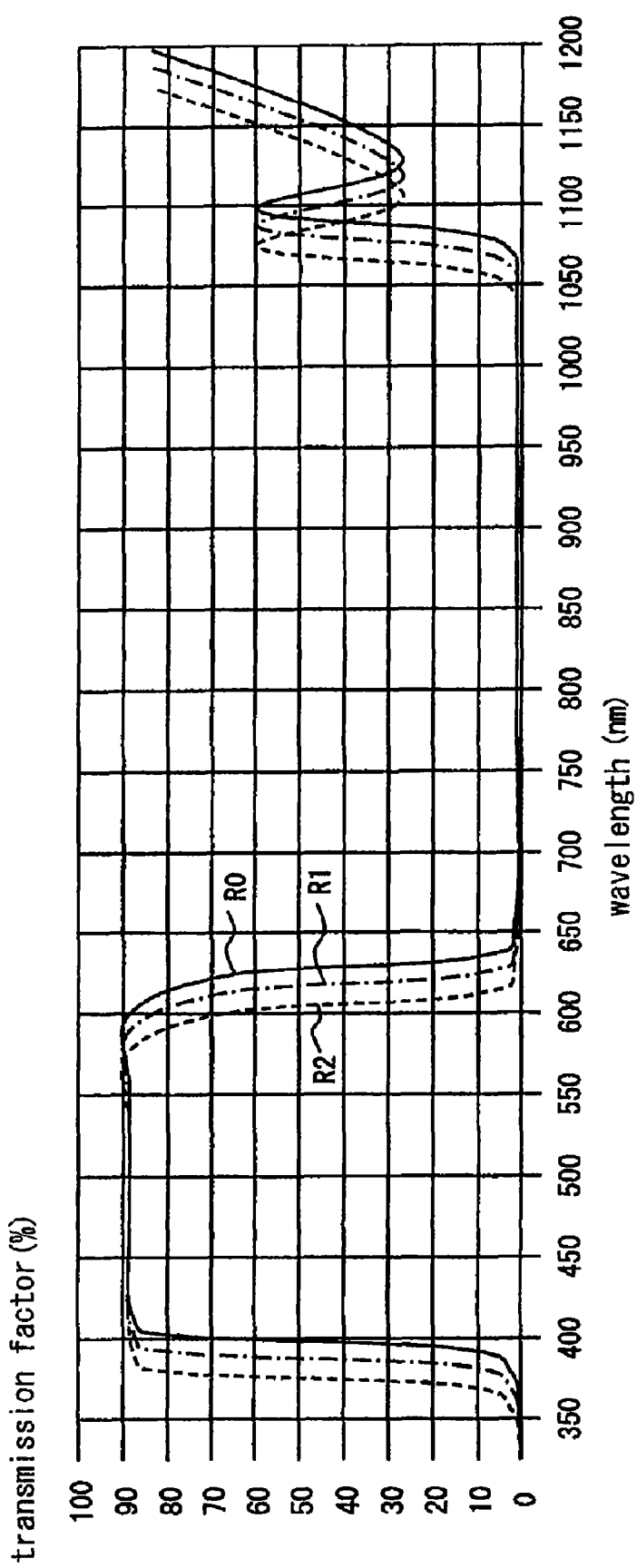
FIG. 30 is a wavelength-transmission factor property of the IR cut filter when there is a small distance between the optical lens and the image sensor.

FIG. 26 is a block diagram illustrating a constitution of a digital signal processing circuit 16 according to the present embodiment. The digital signal processing circuit 16 comprises an AF processing circuit 56. The AF processing circuit 56 extracts a particular frequency component from the color-temperature-corrected imaging signal outputted from the color temperature correcting circuit 34 to thereby judge a focal point, and outputs a progress of a focus state according to a result of the judgment to the CPU 53.

The CPU 53 operates the focal distance adjusting lens 55 based on the focus state inputted from the AF processing circuit 56, the imaging signal from the input terminal T1 and the shutter pressed down in response to the external command T3. The CPU 53, when detecting that the photographer has pressed down the shutter, moves the focal distance adjusting lens 55 so as to attain the focus state.

In the first operation, the image of the photographic subject transmits through the IR cut filter 12 via the focal distance adjusting lens 55 and the optical lens 11 to be consequently image-formed on the image sensor 13. The color temperature correcting circuit 34 outputs the color-temperature-corrected imaging signal to the AF processing circuit 56. The AF processing circuit 56 executes a band-pass filtering process to the color-temperature-corrected imaging signal, and measures a focusing degree from the frequency component in the imaging signal to thereby output the measured focusing degree to the CPU. The CPU 53 operates the focal distance adjusting lens 55 so that the photographic subject is image-formed on the image sensor 13 in the focused state based on the focusing degree outputted from the AF processing circuit 56.

In the state in which the photographic subject is image-formed on the image sensor 13 in the focused state after the first operation is completed, the imaging signal is read from the image sensor 13 in the second operation.

The image of the photographic subject transmits through the IR cut filter 12 via the focal distance adjusting lens 55 and the optical lens 11 and is image-formed on the image sensor 13. The color temperature correcting circuit 34 outputs the color-temperature-corrected imaging signal to the YC processing circuit 35. In the YC processing circuit 35, the imaging signal is synthesized based on the different chrominance signals, the processing for obtaining the video signal is executed, and the processing result is outputted to the memory card 17 to be recorded therein.

As described, according to the present invention, the influence from the modulated sampling intensity of the particular color component caused by the color-temperature shading can be eliminated, and the image pickup operation can be carried out in the optically focused state dealing with a number of different circumstances relating to the color temperature.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. An image input device comprising:
   an optical lens;
   an image sensor for converting an image of a photographic subject obtained from the optical lens into an imaging signal;
   a color filter disposed on the image sensor;
   a color temperature measuring circuit for measuring a color temperature of the imaging signal read from the image sensor for each of a plurality of measurement areas into which an entire area of the image sensor is divided in n, n being a natural number; and
   a color temperature correction circuit for the color temperature of the imaging signal read from the image sensor for each of a plurality of correction areas into which the entire area of the image sensor is divided in m, m being a natural number, wherein:
   m and n satisfy a relationship of m>n, and
   the correction is implemented based on a the color temperature measurement result being calculated by weighted arithmetic according to a distance between the correction areas and the measurement areas with regard to the color temperature measurement result for each measurement area by the color temperature measurement circuit.

2. The image input device as claimed in claim 1, further comprising:
   a memory for temporarily memorizing the imaging signal from the image sensor; and
   a measurement result storing circuit for temporarily memorizing the color temperature measured by the color temperature measuring circuit, wherein
   the color temperature correction circuit inputs the imaging signal from the memory and the color temperature measurement result from the measurement result storing circuit so as to correct the color temperature.

3. The image input device as claimed in claim 2, further comprising:
   a zoom magnification adjusting lens disposed in a previous stage of the optical lens; and
   a microprocessor for controlling the zoom magnification adjusting lens in an initial stage of a photographing operation to have a zoom magnification different to a zoom magnification desired in the photographing operation and validating the color temperature measuring circuit and the measurement result storing circuit with respect to the imaging signal currently obtained, the microprocessor further controlling the zoom magnification adjusting lens to have the zoom magnification desired in the photographing operation, validating the memory with respect to the imaging signal currently obtained and validating the color temperature circuit.

4. The image input device as claimed in claim 1, wherein the plurality of measurement areas in the color temperature measuring circuit and the correction areas in the color temperature correction circuit coincide with.

5. The image input device as claimed in claim 1, wherein the plurality of measurement areas and the correction areas respectively have concentric non-circular shapes similar to a shape of an aperture of the optical lens provided in a previous stage of the image sensor.

6. The image input device as claimed in claim 1, wherein the plurality of measurement areas and the correction areas respectively have concentric circular shapes.

7. The image input device as claimed in claim 1, wherein the plurality of measurement areas have linear states elongated in vertical and horizontal directions passing through a center of the entire area of the image sensor, the correction areas have concentric circular shapes centered at the center of the entire area, and
   the color temperature measuring circuit is adapted to interpolate the color temperature measured in the linear-state measurement areas in estimate information corresponding to the concentric circular divided areas.

8. The image input device as claimed in claim 1, wherein the color temperature measuring circuit is adapted to correct the color temperature of the imaging signal using, of the imaging signals read by the image sensor, only the imaging signal in an area not affected by lens shading by the optical lens provided in a previous stage of the image sensor.

9. The image input device as claimed in claim 1, further comprising:
   an IR-cut filter disposed between the optical lens and the image sensor for removing the infrared ray.

10. The image input device as claimed in claim 1, further comprising:
    a focal distance adjusting lens disposed in a previous stage of the optical lens; and
    an AF processing circuit for extracting a particular frequency component from the color-temperature-corrected imaging signal of the color temperature correction circuit and judging a focusing degree of the imaging signal, wherein
    the focal distance adjusting lens is controlled based on a result of the judgment of the focusing degree from the AF processing circuit.

11. The image input device as claimed in claim 1, wherein the color temperature correction circuit is adapted to correct the color temperature by adding the correction data corresponding to the imaging signal from the image sensor to the imaging signal.

12. The image input device as claimed in claim 1, wherein the color temperature correction circuit is adapted to correct the color temperature by multiplying the imaging signal from the image sensor by the correction data corresponding to the imaging signal.

13. The image input device as claimed in claim 1, wherein the color temperature correction circuit is adapted to correct the color temperature by adding the correction data corresponding to the imaging signal from the image sensor to the imaging signal and multiplying the imaging signal by the correction data.

14. A digital signal processor to which an imaging signal is inputted from an image sensor and for outputting video signal based on the inputted imaging signal, the digital signal processor comprising:
    a color temperature measuring circuit for measuring a color temperature of the imaging signal inputted from the image sensor for each of plurality of measuring areas into which an entire area of the image sensor is divided in n, n being a natural number; and
    a color temperature correction circuit for the color temperature of the imaging signal read from the image sensor for each of a plurality of correction areas into which the entire are of the image sensor is divided in m, m being a natural number, wherein:
    m and n satisfy a relationship of m>n, and
    the correction is implemented based on the color temperature measurement result being calculated by weighted arithmetic according to a distance between the correction areas and the measurement areas with regard to the color temperature measurement result for each measurement area by the color temperature measurement circuit.

* * * * *